United States Patent
Kim et al.

(10) Patent No.: US 10,506,243 B2
(45) Date of Patent: Dec. 10, 2019

(54) IMAGE DECODING METHOD AND DEVICE THEREFOR, AND IMAGE ENCODING METHOD AND DEVICE THEREFOR

(71) Applicant: SAMSUNG ELECTRONICS CO., LTD., Suwon-si (KR)

(72) Inventors: Jae-moon Kim, Uiwang-si (KR); Ki-won Yoo, Seoul (KR); Sung-dae Kim, Yongin-si (KR); Chang-su Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 245 days.

(21) Appl. No.: 15/123,888

(22) PCT Filed: Dec. 17, 2014

(86) PCT No.: PCT/KR2014/012468
§ 371 (c)(1),
(2) Date: Sep. 6, 2016

(87) PCT Pub. No.: WO2015/133712
PCT Pub. Date: Sep. 11, 2015

(65) Prior Publication Data
US 2017/0019672 A1    Jan. 19, 2017

Related U.S. Application Data

(60) Provisional application No. 61/948,881, filed on Mar. 6, 2014.

(51) Int. Cl.
*H04N 19/186* (2014.01)
*H04N 19/59* (2014.01)
*H04N 19/132* (2014.01)

(52) U.S. Cl.
CPC ......... *H04N 19/186* (2014.11); *H04N 19/132* (2014.11); *H04N 19/59* (2014.11)

(58) Field of Classification Search
CPC ............. H04N 1/32309; H04N 1/6005; H04N 1/6008; H04N 19/30; H04N 19/85;
(Continued)

(56) References Cited

U.S. PATENT DOCUMENTS

| 4,873,582 A | 10/1989 | Furuhata et al. |
| 5,798,794 A | 8/1998 | Takahashi |

(Continued)

FOREIGN PATENT DOCUMENTS

| CN | 1364384 A | 8/2002 |
| CN | 1728833 A | 2/2006 |

(Continued)

OTHER PUBLICATIONS

Communication issued by the European Patent Office dated Jan. 23, 2018 in counterpart European Patent Application No. 14884782.5.
(Continued)

*Primary Examiner* — Sath V Perungavoor
*Assistant Examiner* — Daniel Chang
(74) *Attorney, Agent, or Firm* — Sughrue Mion, PLLC

(57) ABSTRACT

A video encoder and decoder are described. The encoder operates on luma data and chroma data. The luma data is split into two channels. The channel split can be based on frequency regions or based on even and odd lines. When the channel split is based on frequency regions, the encoder produces a channel with low frequency data and a channel with high frequency data. A third channel holds chroma data. The decoder recovers the split luma data and the third channel of chroma data. The decoder may then generate one or more pixels to be stored in a line buffer.

6 Claims, 42 Drawing Sheets

(58) Field of Classification Search
CPC ........ H04N 1/4092; G06T 2207/10024; G06T 2207/20182
USPC ............ 382/166, 235, 162, 274; 375/240.02, 375/240.03, 240.26; 348/47
See application file for complete search history.

(56) References Cited

U.S. PATENT DOCUMENTS

| | | | |
|---|---|---|---|
| 6,069,982 A * | 5/2000 | Reuman | G06T 5/20 358/463 |
| 6,795,119 B1 * | 9/2004 | Oda | H04N 9/045 348/234 |
| 6,963,609 B2 | 11/2005 | Gunnewiek et al. | |
| 7,944,508 B1 * | 5/2011 | Chou | H04N 9/78 348/305 |
| 8,620,075 B2 | 12/2013 | Fukuhara et al. | |
| 8,891,610 B2 | 11/2014 | Ngo et al. | |
| 2004/0119886 A1 | 6/2004 | Cook et al. | |
| 2004/0170316 A1 * | 9/2004 | Saquib | H04N 1/4072 382/162 |
| 2005/0219421 A1 * | 10/2005 | Johnson | H04N 9/78 348/663 |
| 2006/0013308 A1 | 1/2006 | Kim | |
| 2006/0017773 A1 * | 1/2006 | Sheraizin | H04N 1/4092 347/43 |
| 2008/0044097 A1 | 2/2008 | Krishnan et al. | |
| 2008/0088807 A1 * | 4/2008 | Moon | G09G 5/02 353/121 |
| 2008/0205765 A1 * | 8/2008 | Fan | H04N 19/186 382/191 |
| 2010/0091132 A1 | 4/2010 | Chen | |
| 2012/0106836 A1 * | 5/2012 | Wu | G06T 5/003 382/162 |
| 2013/0010187 A1 | 1/2013 | Yamashita | |
| 2013/0107970 A1 | 5/2013 | Wang et al. | |
| 2013/0128957 A1 * | 5/2013 | Bankoski | G06T 5/002 375/240.03 |
| 2013/0188196 A1 * | 7/2013 | Kang | G01B 9/02091 356/479 |
| 2013/0251028 A1 * | 9/2013 | Au | H04N 19/176 375/240.02 |
| 2014/0086507 A1 * | 3/2014 | Lin | G06T 5/00 382/274 |
| 2014/0247869 A1 * | 9/2014 | Su | H04N 19/30 375/240.03 |
| 2015/0043815 A1 * | 2/2015 | Tan | H04N 19/147 382/166 |
| 2015/0245042 A1 * | 8/2015 | Thompson | H04N 19/85 382/166 |
| 2015/0304662 A1 | 10/2015 | Liu et al. | |

FOREIGN PATENT DOCUMENTS

| | | |
|---|---|---|
| CN | 102819834 A | 12/2012 |
| CN | 103260018 A | 8/2013 |
| CN | 103313055 A | 9/2013 |
| JP | 63-302688 A | 12/1988 |
| JP | 7-170530 A | 7/1995 |
| JP | 2013-21408 A | 1/2013 |
| KR | 10-2004-0075030 A | 8/2004 |
| KR | 10-2013-0084228 A | 7/2013 |
| WO | 2013067101 A1 | 5/2013 |
| WO | 2013/152736 A1 | 10/2013 |

OTHER PUBLICATIONS

Communication issued by the European Patent Office dated Feb. 14, 2018 in counterpart European Patent Application No. 14884782.5.
Zhang et al., "Updated proposal for frame packing arrangement SEI for 4:4:4 content in 4:2:0 bitstreams", 12th Meeting, Jan. 14-23, 2013, Joint Collaborative Team on Video Coding (JCT-VC) of ITU-T SG 16 WP 3 and ISO/IEC JTC 1/SC 29/WG 11, Jan. 8, 2013, total 9 pages, No. JCTVC-L0316, Geneva; URL: HTTP://WFTP3.ITU.INT/AV-ARCH/JCTVC-SITE, XP030113804.
Gabriellini, et al., "AHG7: Coding 4:2:2 chroma format with 4:2:0 and 4:4:4 format codecs", Joint Collaborative Team on Video Coding (JCT-VC) of ITU-T SG 16 WP 3 and ISO/IEC JTC 1/SC 29AVG 11, 12th Meeting, Jan. 14, 2013-Jan. 23, 2013, JCTVC-L0162, Geneva, Switzerland, 7 pages total.
Weinberger, et al., "The LOCO-I Lossless Image Compression Algorithm: Principles and Standardization into JPEG-LS", Aug. 2008, 34 pages total.
Search Report dated Mar. 12, 2015, issued by the International Searching Authority in counterpart International Patent Application No. PCT/KR2014/012468 (PCT/ISA/210).
Written Opinion dated Mar. 12, 2015, issued by the International Searching Authority in counterpart International Patent Application No. PCT/KR2014/012468 (PCT/ISA/237).
Communication dated Apr. 26, 2016, issued by the Korean Intellectual Property Office in counterpart Korean Patent Application No. 10-2014-0182549.
Communication dated Aug. 31, 2016, issued by the Korean Intellectual Property Office in counterpart Korean Patent Application No. 10-2014-0182549.
Communication dated Oct. 17, 2018 issued by the State Intellectual Property Office of P.R. China in Counterpart Chinese Application No. 201480078652.5.
Communication dated Mar. 20, 2019, issued by the State Intellectual Property Office of P.R. China in counterpart Chinese Application No. 201480078652.5.
Communication dated Jun. 13, 2019, issued by the State Intellectual Property Office of P.R. China in counterpart Chinese Application No. 201480078652.5.

* cited by examiner

FIG. 8B

| s | c | b | d | e | f |
|---|---|---|---|---|---|
|   | a | P0 | P1 | P2 |   |

FIG. 8C

| | | | | | | | | c | b | d | e | f |
|---|---|---|---|---|---|---|---|---|---|---|---|---|
| -10 | -9 | -8 | -7 | -6 | -5 | -4 | -3 | | P0 | P1 | P2 | |

Current 3-pixel

FIG. 8D

| s | c | b | d | e | f |
|---|---|---|---|---|---|
|   | a | P0 | P1 | P2 |   |

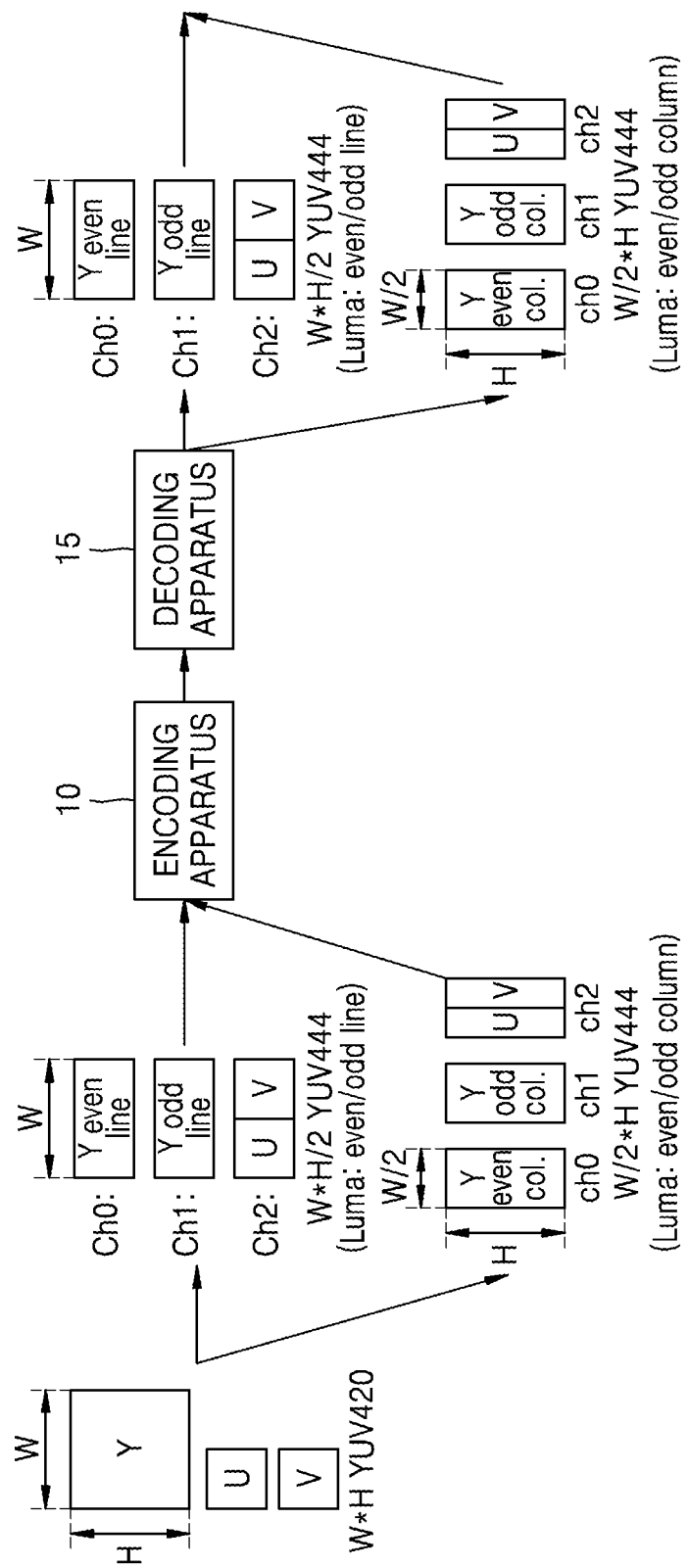

YUV420

FIG. 15C

Forward transform

$H_{0\_0} = (H'_{0\_0} >= -\text{offset1} \&\& H'_{0\_0} < \text{offset1})? H'_{0\_0} + \text{offset2}$ :
  $(H'_{0\_0} >= -\text{offset2} \&\& H'_{0\_0} < -\text{offset1})? H'_{0\_0}/2 - \text{offset1}/2 + \text{offset2}$ :
  $(H'_{0\_0} >= \text{offset1} \&\& H'_{0\_0} < \text{offset2})? H'_{0\_0}/2 + \text{offset1}/2 + \text{offset2}$ :
  $(H'_{0\_0} < -\text{offset2} \&\& H'_{0\_0}/4 - \text{offset1}) + \text{offset2}$ :
                     $H'_{0\_0}/4 + \text{offset1}) + \text{offset2}$ :

Backward transform

$H'_{0\_0} = (H_{0\_0} >= \text{offset1} \&\& H_{0\_0} < (\text{offset1}+\text{offset2}))? H_{0\_0} - \text{offset2}$ :
  $(H_{0\_0} >= \text{offset1}/2 \&\& H_{0\_0} < \text{offset1})? (H_{0\_0} - \text{offset2} + \text{offset\_1}/2)*2+1$ :
  $(H_{0\_0} >= \text{offset1}+ \text{offset\_2}) \&\& H_{0\_0} (\text{offset\_1}*3/2 + \text{offset\_2}))?$
                     $(H_{0\_0} - \text{offset\_2} - \text{offset\_1}/2)*2 + 1$ :
                     $(H_{0\_0} < -\text{offset1}/2)? (H_{0\_0} - \text{offset\_2} + \text{offset\_1})*4 + 2$ :
                                        $(H_{0\_0} - \text{offset\_2} - \text{offset\_1})*4 + 2$ :

offset1 = 1 << (bitdepth-2)
offset2 = 1 << (bitdepth-1)

⟹ Simplification

Forward transform (for 8bit-per-pixel)

```
assign o_high = (w_high_tmp[8:6] == 3'b000)? {2'b10, w_high_tmp[5:0]} :  // w_high_tmp:  0 ~ 63  -> 128 ~ 191
                (w_high_tmp[8:6] == 3'b111)? {2'b01, w_high_tmp[5:0]} :  // w_high_tmp: -64 ~ -1  -> 64 ~ 127
                (w_high_tmp[8:7] == 2'b00)?  {3'b110, w_high_tmp[5:1]} : // w_high_tmp: 64 ~ 127  -> 192 ~ 223
                (w_high_tmp[8:7] == 2'b11)?  {3'b001, w_high_tmp[5:1]} : // w_high_tmp: -128 ~ -65 -> 32 ~ 63
                (w_high_tmp[8]   == 1'b0)?   {3'b111, w_high_tmp[6:2]} : // w_high_tmp: 128 ~ 255 -> 224 ~ 255
                                             {3'b000, w_high_tmp[6:2]} ; // w_high_tmp: -255 ~-129 -> 0 ~ 31
```

Backward transform (for 8 bit-per-pixel)

```
assign o_high_tmp = (w_high[7:5] == 3'b000)? {3'b000} :    // w_high:   0 ~ 31   -> -255 ~-129
                    (w_high[7:5] == 3'b111)? {3'b111} :    // w_high: 224 ~ 255  -> 128 ~ 255
                    (w_high[7:6] == 2'b00)?  {3'b110, w_high[4:0], 1'b1} :  // w_high:  32 ~ 63   -> -128 ~ -65
                    (w_high[7:6] == 2'b11)?  {3'b001, w_high[4:0], 1'b1} :  // w_high: 192 ~ 223  -> 64 ~ 127
                    (w_high[7]   == 1'b0)?   {w_high[5:0]} :                // w_high:  64 ~ 127  -> -1
                                             {w_high[5:0]} ;                // w_high: 128 ~ 191  -> 0 ~ 63
```

IMAGE DECODING METHOD AND DEVICE THEREFOR, AND IMAGE ENCODING METHOD AND DEVICE THEREFOR

TECHNICAL FIELD

The present disclosure relates to video decoding methods and apparatuses and video encoding methods and apparatuses, and more particularly, to video decoding methods and apparatuses for decoding YUV 4:2:0 format image data and video encoding methods and apparatuses for efficiently encoding YUV 4:2:0 format image data.

BACKGROUND ART

In order to display high-resolution or high-definition video contents, the high-resolution or high-definition video contents are transmitted to a display apparatus through a display link. However, since the bandwidth of the display link is restricted, there is an increasing need to efficiently compress the high-resolution or high-definition video contents and transmit the compressed video contents through the display link. Thus, various video codecs are developed to efficiently encode or decode high-resolution or high-definition video contents.

In the case of a video codec, encoding and decoding may be performed on the premise of inputting YUV 4:4:4 format image data. However, when an electronic apparatus uses YUV 4:2:0 format image data, it is necessary to convert YUV 4:2:0 format image data into YUV 4:4:4 format image data. In particular, a process of interpolating chroma data included in image data is performed in the process of converting the image data. However, the video codec encodes chroma data generated during the interpolation process under the determination of the chroma data as informative chroma data. Therefore, since unnecessary chroma data are also encoded, an actual compression ratio in the video codec is smaller than a compression ratio calculated on the assumption of encoding YUV 4:2:0 format image data.

DETAILED DESCRIPTION OF THE INVENTION

Technical Problem

According to an aspect of the present disclosure, there is a provided a video data encoding method including splitting luma data having one component included in image data and allocating the luma data to luma channels including a plurality of channels; allocating chroma data having a plurality of components included in the image data to a chroma channel including one channel; and encoding the image data based on the luma data allocated to the luma channels and the chroma data allocated to the chroma channel.

According to another aspect of the present disclosure, there is a provided a video data encoding method including receiving image data; up-sampling the received image data; and encoding the up-sampled image data, wherein the up-sampling of the received image data includes: converting the chroma data by allocating at least one chroma component located in a plurality of lines in chroma data included in the received image data to an empty region of one of the plurality of lines; and allocating a predetermined sample value to other lines except for the one line based on the converted chroma data.

According to another aspect of the present disclosure, there is a provided a video data encoding method including receiving image data; up-sampling the received image data; and allocating each of at least one chroma component located in a region that is not up-sampled in one line of chroma data included in the up-sampled image data to a different region of the line from the region in which each of the at least one chroma component is located such that a plurality of chroma components located in the region that is not up-sampled are adjacent to each other in the line; and encoding chroma data including the allocated at least one chroma component.

According to another aspect of the present disclosure, there is a provided a video data encoding method including receiving image data; up-sampling chroma data included in the received image data; and encoding chroma data of one of odd lines or even lines among a plurality of lines.

According to another aspect of the present disclosure, there is a provided a video data encoding method including receiving image data; up-sampling the received image data; and encoding the up-sampled image data, wherein the up-sampling of the received image data includes allocating at least one of a plurality of chroma components located in one of a plurality of lines in chroma data included in the received image data to different lines from the one line; and obtaining a sample value that is to be allocated to an empty region of the one line based on a sample value of the at least one chroma component allocated to the different lines.

According to another aspect of the present disclosure, there is a provided a video data decoding method including receiving a bitsream including encoded image information; decoding an image based on the encoded image information and obtaining luma data allocated to luma channels including a plurality of channels and chroma data allocated to a chroma channel including one channel from data generated by decoding the image; merging the obtained luma data as luma data having one component; splitting the obtained chroma data into chroma data having a plurality of components; and reconstructing the image based on the luma data having one component generated by merging the obtained luma data and the split chroma data having the plurality of components.

According to another aspect of the present disclosure, there is a provided a video data decoding method including receiving a bitsream including encoded image information by converting chroma data by allocating at least one chroma component located at a plurality of lines in chroma data included in image data to an empty region of one of the plurality of lines and allocating predetermined values to other lines except for the one line based on the converted chroma data; decoding an image based on the encoded image information and obtaining the luma data and the chroma data; and reconstructing the image based on the obtained luma data and chroma data.

According to another aspect of the present disclosure, there is a provided a video data decoding method including receiving a bitsream including image information in which image data is up-sampled, each of at least one chroma component located in a region that is not up-sampled in one line of chroma data included in the up-sampled image data is allocated to a different region of the line from the region in which each of the at least one chroma component is located such that a plurality of chroma components located in the region that is not up-sampled are adjacent to each other in the line and chroma data including the allocated chroma component and luma data included in the image data are encoded; decoding an image based on the encoded image information and obtaining chroma data including the allocated chroma components and luma data included in the image information; and reconstructing the image based on the chroma data including the allocated chroma components and luma data included in the image information.

According to another aspect of the present disclosure, there is a provided a video data decoding method including receiving a bitstream including image information in which chroma data included in image data is up-sampled and chroma data of one of odd lines or even lines in a plurality of lines among the up-sampled chroma data and luma data included in the image data are encoded; decoding an image based on the encoded image information and obtaining the chroma data of one of even lines or odd lines in the plurality of lines among the up-sampled chroma data and the luma data included in the image data; and decoding an image based on the encoded image information and reconstructing the image based on the chroma data of one of even lines or odd lines in the plurality of lines among the up-sampled chroma data and the luma data included in the image data.

According to another aspect of the present disclosure, there is a provided a video data decoding method including receiving a bitstream including image information in which at least one of a plurality of chroma components located at one line of a plurality of lines of chroma data included in the image data is allocated to a different line from the line, a sample value that is to be allocated to an empty region of the line is obtained based on a sample value of the chroma component allocated to the different line, and chroma data including the obtained sample value and luma data included in the image data are encoded; decoding an image based on the encoded image information and obtaining the chroma data including the obtained sample value and the luma data included in the image data; and reconstructing the image based on the chroma data including the obtained sample value and the luma data included in the image data.

According to another aspect of the present disclosure, there is a provided a non-transitory computer-readable recording medium having recorded thereon a computer program for executing methods of encoding and decoding video data.

Advantageous Effects

Methods of encoding and decoding image data according to an embodiment of the present disclosure may be used to efficiently compress the image data, decoding the compressed image data, and reconstruct an image. In particular, the methods of encoding and decoding video data according to an embodiment of the present disclosure may be used to efficiently compress YUV 4:2:0 format image data, decoding the compressed image data, and reconstruct an image.

BRIEF DESCRIPTION OF THE DRAWINGS

FIGS. 8B through 8D are diagrams illustrating a method of predicting a current pixel in encoding/decoding apparatuses according to an embodiment of the present disclosure.

FIG. 9B is a diagram for describing a process of encoding/decoding YUV 4:2:0 format data without up-sampling according to an embodiment of the present disclosure.

FIG. 15C is a diagram for describing a detailed process of determining luma data of a high frequency region according to an embodiment of the present disclosure.

BEST MODE

Figure 1:
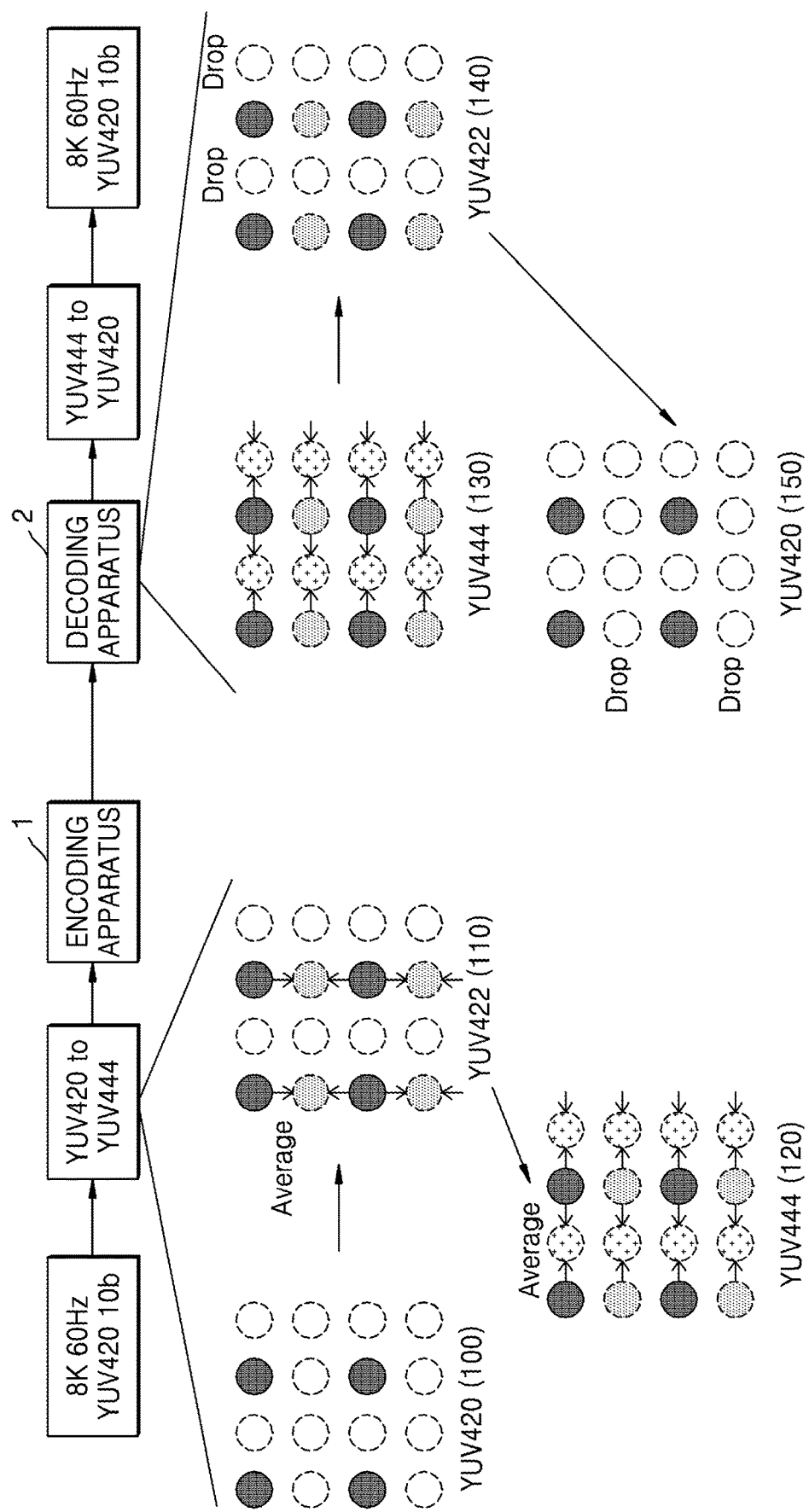
FIG. 1 is a diagram illustrating an environment for encoding and decoding image data.

According to an aspect of the present disclosure, there is provided a video data encoding method including splitting luma data having one component included in image data and allocating the luma data to luma channels including a plurality of channels; allocating chroma data having a plurality of components included in the image data to a chroma channel including one channel; and encoding the image data based on the luma data allocated to the luma channels and the chroma data allocated to the chroma channel.

The luma channels may include two channels, and wherein the allocating of the luma data to luma channels includes splitting the luma data into two pieces of luma data in a spatial domain; and allocating the split luma data to the two channels.

The encoding of the image data may include encoding the luma data allocated to the luma channel including the plurality of channels by using independent quantization parameters with respect to each of the plurality of channels.

The luma channels may include two channels, and wherein the allocating of the luma data to luma channels includes splitting the luma data having one component into two pieces of luma data in a frequency region; and allocating the split luma data to the two channels.

The splitting of the luma data having one component into the two pieces of luma data in the frequency region may split the luma data having one component into luma data of a low frequency region and luma data of a high frequency region.

The splitting of the luma data having one component into two pieces of luma data in the frequency region may include obtaining a sample value of a high frequency region; determining one first portion range including the obtained sample value among a plurality of first portion ranges corresponding to a first allowable range of the sample value of the high frequency region; and mapping the first portion range to one of a plurality of second portion ranges corresponding to a second allowable range of the sample value of the high frequency region, wherein a size of the first allowable range is greater than a size of the second allowable range, and, when an absolute value of the sample value of the high frequency region is greater than a predetermined value, a size of the determined first portion range is greater than a size of the one second portion range, and wherein the luma data of the high frequency region includes a sample value of the high frequency region mapped to a value of the one second portion range.

The allocating of the chroma data having the plurality of components included in the image data to the chroma channel including one channel may include time sharing the chroma channel; and allocating the chroma data having the plurality of components to the time shared chroma channel.

The image data may be image data in a YUV color space, the luma data may include data of the Y component, and the chroma data may include data of U and V components.

According to another aspect of the present disclosure, there is a provided a video data encoding method including receiving image data; up-sampling the received image data; and encoding the up-sampled image data, wherein the up-sampling of the received image data includes converting the chroma data by allocating at least one chroma component located in a plurality of lines in chroma data included in the received image data to an empty region of one of the plurality of lines; and allocating a predetermined sample value to other lines except for the one line based on the converted chroma data.

According to another aspect of the present disclosure, there is a provided a video data encoding method including receiving image data; up-sampling the received image data; and allocating each of at least one chroma component located in a region that is not up-sampled in one line of chroma data included in the up-sampled image data to a different region of the line from the region in which each of the at least one chroma component is located such that a plurality of chroma components located in the region that is not up-sampled are adjacent to each other in the line; and encoding chroma data including the allocated at least one chroma component.

According to another aspect of the present disclosure, there is a provided a video data encoding method including receiving image data; up-sampling chroma data included in the received image data; and encoding chroma data of one of odd lines or even lines among a plurality of lines.

According to another aspect of the present disclosure, there is a provided a video data encoding method including receiving image data; up-sampling the received image data; and encoding the up-sampled image data, wherein the up-sampling of the received image data includes allocating at least one of a plurality of chroma components located in one of a plurality of lines in chroma data included in the received image data to different lines from the one line; and obtaining a sample value that is to be allocated to an empty region of the one line based on a sample value of the at least one chroma component allocated to the different lines.

According to another aspect of the present disclosure, there is a provided a video data decoding method including receiving a bitsream including encoded image information; decoding an image based on the encoded image information and obtaining luma data allocated to luma channels including a plurality of channels and chroma data allocated to a chroma channel including one channel from data generated by decoding the image; merging the obtained luma data as luma data having one component; splitting the obtained chroma data into chroma data having a plurality of components; and reconstructing the image based on the luma data having one component generated by merging the obtained luma data and the split chroma data having the plurality of components.

The luma channels may include two channels, wherein the obtained luma data allocated to the luma channels is luma data that is split into two pieces of luma data in a spatial domain and allocated to the two channels, wherein the merging of the obtained luma data as luma data having one component includes merging the two pieces of luma data as one piece of luma data.

The decoding of the image based on the encoded image information and the obtaining of the luma data allocated to luma channels including the plurality of channels and the chroma data allocated to the chroma channel including one channel from data generated by decoding the image may include decoding the image by using independent quantization parameters with respect to the luma channels including the plurality of channels.

The luma channels may include two channels, wherein the obtained luma data allocated to the luma channels is luma data that is split into two pieces of luma data in a frequency region and allocated to the two channels, and wherein the merging of the obtained luma data as luma data having one component includes merging the two pieces of luma data split in the frequency region as one piece of luma data.

The luma data of the luma channel may be luma data that the luma data having one component is split into luma data of a low frequency region and luma data of a high frequency region and are allocated to the two luma channels including a plurality of channels.

According to another aspect of the present disclosure, there is a provided a video data decoding method including receiving a bitstream including encoded image information by converting chroma data by allocating at least one chroma component located at a plurality of lines in chroma data included in image data to an empty region of one of the plurality of lines and allocating predetermined values to other lines except for the one line based on the converted chroma data; decoding an image based on the encoded image information and obtaining the luma data and the chroma data; and reconstructing the image based on the obtained luma data and chroma data.

According to another aspect of the present disclosure, there is a provided a video data decoding method including receiving a bitstream including image information in which image data is up-sampled, each of at least one chroma component located in a region that is not up-sampled in one line of chroma data included in the up-sampled image data is allocated to a different region of the line from the region in which each of the at least one chroma component is located such that a plurality of chroma components located in the region that is not up-sampled are adjacent to each other in the line and chroma data including the allocated chroma component and luma data included in the image data are encoded; decoding an image based on the encoded image information and obtaining chroma data including the allocated chroma components and luma data included in the image information; and reconstructing the image based on the chroma data including the allocated chroma components and luma data included in the image information.

According to another aspect of the present disclosure, there is a provided a video data decoding method including receiving a bitstream including image information in which chroma data included in image data is up-sampled and chroma data of one of odd lines or even lines in a plurality of lines among the up-sampled chroma data and luma data included in the image data are encoded; decoding an image based on the encoded image information and obtaining the chroma data of one of even lines or odd lines in the plurality of lines among the up-sampled chroma data and the luma data included in the image data; and decoding an image based on the encoded image information and reconstructing the image based on the chroma data of one of even lines or odd lines in the plurality of lines among the up-sampled chroma data and the luma data included in the image data.

According to another aspect of the present disclosure, there is a provided a video data decoding method including receiving a bitstream including image information in which at least one of a plurality of chroma components located at one line of a plurality of lines of chroma data included in the image data is allocated to a different line from the line, a sample value that is to be allocated to an empty region of the line is obtained based on a sample value of the chroma component allocated to the different line, and chroma data including the obtained sample value and luma data included in the image data are encoded; decoding an image based on the encoded image information and obtaining the chroma data including the obtained sample value and the luma data included in the image data; and reconstructing the image based on the chroma data including the obtained sample value and the luma data included in the image data.

According to another aspect of the present disclosure, there is a provided a non-transitory computer-readable recording medium having recorded thereon a computer program for executing a method.

According to another aspect of the present disclosure, there is a provided a video data encoding apparatus including a receiver configured to receive image data; a data allocator configured to split luma data having one component included in the image data and allocate the luma data to luma channels including a plurality of channels and allocate chroma data having a plurality of components included in the image data to a chroma channel including one channel; and an encoder configured to encode the image data based on the luma data allocated to the luma channels and the chroma data allocated to the chroma channel.

According to another aspect of the present disclosure, there is a provided a video data decoding apparatus including a receiver configured to receive a bitsream including encoded image information; a decoder configured to decode an image based on the encoded image information; and a reconstructor configured to obtain luma data allocated to luma channels including a plurality of channels and chroma data allocated to a chroma channel including one channel from data generated by decoding the image, merge the obtained luma data as luma data having one component, split the obtained chroma data into chroma data having a plurality of components, and reconstruct the image based on the luma data having one component generated by merging the obtained luma data and the split chroma data having the plurality of components.

MODE OF THE INVENTION

Hereinafter, 'images' may refer to still images of video or moving images of video, that is, video itself.

Hereinafter, 'samples' may refer to data that are allocated to sampling positions of images and are to be processed. For example, 'samples' may be pixels in an image of a spatial domain.

FIG. 1 is a diagram illustrating an environment for encoding and decoding image data.

It is assumed that an encoding apparatus 1 receives an input of YUV 4:4:4 format image data and encodes the YUV 4:4:4 format image data.

It is also assumed that a decoding apparatus 2 receives an input of YUV 4:4:4 format image data, decodes the YUV 4:4:4 format image data, and outputs the decoded image data.

The encoding apparatus 1 may be included in an electronic apparatus to perform functions thereof.

For example, the encoding apparatus 1 may be included in encoding apparatuses 10, 20, 30, 40, 50, and 60, which will be described later, to perform functions thereof. However, the encoding apparatuses 10, 20, 30, 40, 50, and 60 may preferentially perform functions contrary to some functions of the encoding apparatus 1 and may not perform some functions of the encoding apparatus 1.

The decoding apparatus 2 may be included in an electronic apparatus including the decoding apparatus 2 or in a separate electronic apparatus different from the electronic apparatus, to perform functions thereof. For example, the decoding apparatus 2 may be included in decoding apparatuses 15, 25, 35, 45, 55, and 65, which will be described later, to perform functions thereof. However, the decoding apparatuses 15, 25, 35, 45, 55, and 65 may preferentially perform functions contrary to some functions of the decoding apparatus 2 and may not perform some functions of the decoding apparatus 2.

Referring to FIG. 1, it is assumed that image data (8K 60 Hz YUV420 10b) are input, wherein a definition is 8K, a frequency is 60 Hz, the number of bits of a pixel for representing luma data is 10 bits, and an image data format is a YUV 4:2:0 format. In this regard, considering the definition "8K" (a resolution of 7680×4320), the frequency "60 Hz", the number of bits "10b" of the pixel for representing luma data, and the image data format (in the case of a YUV 4:2:0 format, bits 1.5 times the number of bits used to represent luma data are required), a required data transmission rate is 7680×4320×60>1.5=29.86 gigabit per seconds (Gps).

The YUV 4:2:0 format image data are to be compressed at 2.5:1. In this case, a transmission rate of the final output image data needs to be 29.89 Gps×1/2.5=11.94 Gps.

In order to process image data in the encoding apparatus 1, YUV 4:2:0 format image data need to be converted into YUV 4:4:4 format image data. In this regard, a conversion process is not performed on luma data included in the YUV 4:2:0 format image data, and an interpolation process is performed on chroma data included in the YUV 4:2:0 format image data (hereinafter referred to as YUV 4:2:0 format chroma data).

The encoding apparatus 1 may first convert YUV 4:2:0 format chroma data into YUV 4:2:2 format chroma data and then convert the YUV 4:2:2 format chroma data into YUV 4:4:4 format chroma data.

As an example, referring to FIG. 1, an average of sample values of chroma components of two adjacent odd lines in YUV 4:2:0 format chroma data 100 may be calculated, the calculated average may be set as a sample value of a chroma component of an even line between the two adjacent odd lines, and thus the YUV 4:2:0 format chroma data 100 may be converted into YUV 4:2:2 format chroma data 110. This data conversion process is referred to as up-sampling.

In detail, up-sampling means a process of filling (by using a sample value of an adjacent chroma pixel) a sample value of an empty chroma pixel having no data among chroma pixels corresponding to luma pixels (e.g., chroma pixels of the same positions as positions of luma pixels in an image).

Referring to FIG. 1, an average value of sample values of chroma components of two adjacent odd columns in the YUV 4:2:2 format chroma data 110 may be calculated, the calculated average value may be set as a sample value of a chroma component of an even column between the two adjacent odd columns, and then the YUV 4:2:2 format chroma data 110 may be converted into YUV 4:4:4 format chroma data 120. Likewise, a process of converting YUV 4:2:2 format chroma data into YUV 4:4:4 format chroma data is also referred to as up-sampling.

In the process of converting YUV 4:2:0 format image data into YUV 4:4:4 format image data, the size of image data increases. Theoretically, the size of YUV 4:4:4 format image data is up to two times larger than the size of YUV 4:2:0 format image data. Thus, by taking this into account, a required transmission rate of the YUV 4:4:4 format image data is 59.71 Gps (=7680×4320×60×3×10 bps) that is about two times of 29.86 Gps.

When the encoding apparatus 1 receives an input of YUV 4:4:4 format image data, encodes the YUV 4:4:4 format image data, and outputs the encoded image data, the image data needs to be compressed at a 5:1 ratio such that a transmission rate of the encoded image data may be 11.94 Gps.

Thus, problematically, the compression ratio (5:1) of the YUV 4:4:4 format image data input to the encoding apparatus 1 with respect to the encoded image data is much higher than the compression ratio (2.5:1) of the YUV 4:2:0 format image data including only actually significant information with respect to the encoded image data. In this regard, the significant information means encoded image information that is related to an actual image, and insignificant information means information that is not directly related to the image. For example, the insignificant information may be information including a sample value filled in the process of filling a sample value of an empty chroma pixel having no data among the chroma pixels (i.e., an up-sampling process).

Thus, when the YUV 4:2:0 format image data are converted into YUV 4:4:4 format image data, it is necessary to up-sample the image data in order to efficiently compress (i.e., encode) the image data.

The encoding apparatus 1 is not limited to an operation of receiving an input of YUV 4:4:4 format image data, encoding the YUV 4:4:4 format image data, and outputting the encoded image data. A configuration of the encoding apparatus 1 may be partially modified to encode image data on the premise of inputting YUV 4:2:0 format image data including only significant information. For example, the encoding apparatus 1 needs to efficiently compress the image data by not encoding data of an up-sampled pixel or by minimizing the image data including information related to the up-sampled pixel.

The decoding apparatus 2 receives a bitstream including image information encoded by the encoding apparatus 1.

The decoding apparatus 2 inversely performs the process performed by the encoding apparatus 1 by using the encoded image information obtained from the bitstream. Thus, the decoding apparatus 2 may reconstruct the YUV 4:4:4 format image data by decoding the image information encoded by the encoding apparatus 1.

In this regard, image data including only significant information are YUV 4:2:0 format image data, the YUV 4:2:0 format image data are up-sampled, and the up-sampled image data are encoded, and thus, data used to actually display an image the electronic apparatus needs to also be YUV 4:2:0 format image data.

Therefore, a process of converting YUV 4:4:4 format image data into YUV 4:2:0 format image data is additionally performed.

In detail, referring to FIG. 1, sample values of chroma components of adjacent even columns in chroma data 130 included in YUV 4:4:4 format image data may be dropped and thus, the chroma data 130 may be converted into YUV 4:2:2 format chroma data 140.

This data conversion process is referred to as down-sampling. In detail, down-sampling means a process of dropping a sample value of a chroma pixel including no significant information among chroma pixels corresponding to luma pixels (e.g., chroma pixels of the same positions as positions of luma pixels in an image).

Referring to FIG. 1, sample values of chroma components of adjacent even lines in the YUV 4:2:2 format chroma data 140 may be dropped and thus, the YUV 4:2:2 format chroma data 140 may be converted into YUV 4:2:0 format chroma data 150. Likewise, a process of converting the YUV 4:2:2 format chroma data 140 into the YUV 4:2:0 format chroma data 150 is referred to as down-sampling.

The electronic apparatus may reconstruct the image by using the YUV 4:2:0 format chroma data 150. The electronic apparatus may display the reconstructed image. A user may view the displayed image.

If an up-sampling method is used for efficient compression in the process of converting YUV 4:2:0 format image data into YUV 4:4:4 format image data before the image data is input to the encoding apparatus 1, a down-sampling method is necessary in the process of converting the YUV 4:4:4 format image data into the YUV 4:2:0 format image data in an image decoding process by inversely performing the up-sampling method. When the configuration of the encoding apparatus 1 is partially modified to encode the image data on the premise of inputting the YUV 4:2:0 format image data including only significant information, a method of efficiently decode the compressively-encoded image data inversely is necessary by not encoding data of an up-sampled pixel by modifying the decoding apparatus 2 to inversely output the YUV 4:2:0 format image data including only significant information or by minimizing the image data including information related to the up-sampled pixel.

Figure 2A:
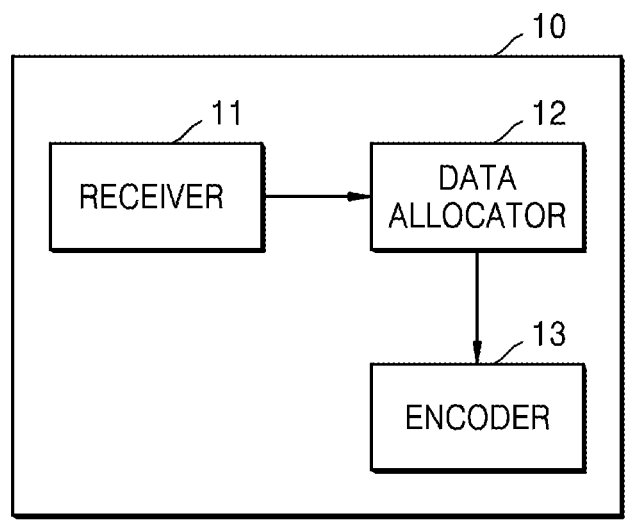
FIG. 2A is a block diagram of an encoding apparatus according to an embodiment of the present disclosure.

FIG. 2A is a block diagram of an encoding apparatus 10 according to an embodiment of the present disclosure.

The encoding apparatus 10 according to an embodiment of the present disclosure may split luma data having one component of image data, allocate the luma data to luma channels comprising a plurality of channels, allocate chroma data having a plurality of components included in the image data to one chroma channel, and encode the image data based on the luma data allocated to the luma channels and the chroma data allocated to the chroma channel, thereby improving encoding efficiency.

The encoding apparatus 10 may include the encoding apparatus 1 and efficiently allocate the image data to the luma channels and the chroma channel without correcting the encoding apparatus 1, thereby improving encoding efficiency.

In general, the encoding apparatus 1 may have one channel for luma data and two channels for chroma data.

That is, one channel for luma data of a Y component and two channels for respectively chroma data of U and Y components are present. In contrast, the encoding apparatus 10 changes one channel for chroma data to an additional channel for luma data. The encoding apparatus 10 may split luma data having one component and allocate the luma data to the changed additional channel for luma data and the channel of the encoding apparatus 10 for luma data.

The channel for chroma data is changed to the additional channel for luma data, and thus a channel for chroma data is one.

Therefore, the encoding apparatus 10 may allocate chroma data having a plurality of components to one chroma channel.

The encoding apparatus 10 may encode the image data based on data allocated to each channel.

A size of luma data of the Y component in YUV 4:2:0 format image data is four times a size of chroma data including a U component or the Y component. Each one of the Y, U, and V components is allocated to the channel of the encoding apparatus 10 for the YUV 4:2:0 format image data. The Y, U, and V components have different data sizes. Thus, since one channel has a great amount of data including significant information and another channel has a small amount of data including significant information, each channel is not efficiently used.

A process of converting the YUV 4:2:0 format image data into YUV 4:4:4 format image data, as a process of filling data in order to make a size of chroma data, which is insufficient compared to luma data, identical with a size of the luma data, allocates the data other than significant information. Thus, data unnecessary for decoding an image is filled, which causes a waste of unnecessary bits.

Therefore, without an up-sampling process, luma data having one component is split and allocated to a plurality of channels and chroma data having a plurality of components is allocated to one channel, and thus the same size of significant data may be allocated to each channel. In this regard, the same size may mean that the same number of bits is used on the premise that the number of bits per pixel is the same.

Therefore, as a result, the same size of luma or chroma data is allocated to each channel, like the YUV 4:4:4 format image data.

However, since the YUV 4:4:4 format image data is image data up-sampled by using the YUV 4:2:0 format image data, some of the YUV 4:4:4 format image data does not include significant information, whereas, without an up-sampling process, since some chroma channels are changed to luma channels, luma data is split, the split luma data is allocated to the changed luma channels, and chroma data having a plurality of components is allocated to remaining chroma channels, all of image data without the up-sampling process includes significant information, and thus channels may be more efficiently used.

That is, while the YUV 4:2:0 format image data is converted into the YUV 4:4:4 format image data such that the YUV 4:4:4 format image data includes insignificant information that is unnecessary for decoding an image, the same size of data may be allocated to each channel by using only the YUV 4:2:0 format image data according to the present disclosure without including insignificant information that is unnecessary for decoding an image, and thus channels may be efficiently utilized, and the image data may not include insignificant encoded image information, thereby improving encoding efficiency.

Referring to FIG. 2A, the encoding apparatus 10 includes a receiver 11, a data allocator 12, and an encoder 13.

The receiver 11 receives an image. In detail, the image may include luma data having one component and chroma data having a plurality of components. For example, the image data may be image data in a YUV color space, the luma data may include data of the Y component, and the chroma data may include data of U and V components. In particular, the image data may be the YUV 4:2:0 format image data.

The data allocator 12 may split the luma data having one component of the image data received from the receiver 10 and allocate the luma data to the luma channels comprising the plurality of channels. In this regard, the luma channels may include two channels.

The data allocator 12 may split the luma data into two pieces of luma data in a spatial domain. The data allocator 12 may split the spatial domain into even columns and odd columns, thereby splitting the luma data into the two pieces of luma data. Alternatively, the data allocator 12 may split the spatial domain into even lines and odd lines, thereby splitting the luma data into the two pieces of luma data. Alternatively, the data allocator 12 may split the spatial domain horizontally or vertically, thereby splitting the luma data into the two pieces of luma data. The present disclosure is not limited thereto. The data allocator 12 may split the luma data into two pieces of luma data in various shapes.

The data allocator 12 may split the luma data having one component into two pieces of luma data in a frequency region.

The data allocator 12 may allocate the two pieces of luma data split in the frequency region to two channels. For example, the data allocator 12 may split the luma data having one component into luma data of a low frequency region and luma data of a high frequency region.

The data allocator 12 may allocate the chroma data having the plurality of components included in the image data to one chroma channel. In detail, the data allocator 12 may allocate two pieces of chroma data including two chroma components to one spatial domain.

The encoder 13 may receive the luma data and the chroma data that are allocated to luma channels and the chroma channel and encode the image data based on the received luma data and chroma data. During a process of encoding the image data, the encoder 13 may perform a function of the encoding apparatus 1.

The encoder 13 may encode the luma data of the luma channels comprising the plurality of channels by using an independent quantization parameter with respect to each of the plurality of channels. In particular, the encoder 13 may encode the luma data of the luma channels comprising the plurality of channels by using an independent quantization parameter with respect to each of two channels when splitting the luma data into two pieces of luma data in the spatial domain. In this regard, the encoder 13 may use the chroma channel used in the encoding apparatus 1 as an additional luma channel. In case of the encoding apparatus 1, a quantization parameter used in a chroma channel may be determined to be dependent upon a quantization parameter used in a luma channel. Thus, when the encoder 13 performs the function of the encoding apparatus 1, since some of luma data encoded in the chroma channel of the encoding apparatus 1 changed as the additional luma channel uses a different quantization parameter from some of luma data encoded in the luma channel of the encoding apparatus 1, an amount of the image data lost during a quantization process may be different. When the image data is reconstructed, an image quality with respect to a location of an image may be different according to the amount of the image data lost during the quantization process, and thus the image quality deteriorates. To prevent the deterioration of the image quality, the encoder 13 may use the independent quantization parameter with respect to each of the two luma channels by correcting the encoding apparatus 1.

For example, the encoder 13 may split the spatial domain into even and odd lines and split the luma data into two pieces of luma data, allocate the split two pieces of luma data to two channels, and encode the luma data by using the same quantization parameter with respect to the two channels.

The encoder 13 may obtain a sample value of a high frequency region through frequency conversion and determine one first portion range including the obtained sample value among a plurality of first portion ranges corresponding to a first allowable range of the sample value of the high frequency region when splitting the luma data having one component into two pieces of luma data in a frequency region. In this regard, a plurality of second portion ranges may be generated by dividing a second allowable range into several sections. In this regard, when the second allowable range is divided into several sections, the second allowable range may be split not equally but unequally. When the second allowable range is unequally split, in particular, in a section in which a size of a sample value is greater than a certain size, a size of the section may be smaller than a size of a section equal to or smaller than the certain size.

When an absolute value of the sample value of the high frequency region is equal to or greater than a predetermined value, the encoder 13 may correspondingly map values of one second portion range (hereinafter referred to as a mapping range) of the plurality of second portion ranges corresponding to the second allowable range smaller than the first allowable range to values of the determined first portion range. In this regard, the mapping range may be smaller than the determined first portion range. Thus, the values of the determined first portion range may be mapped to the values of the mapping range at 2:1, 3:1, and 4:1 ratios other than a 1:1 ratio.

The reason why unequal mapping is performed as described above is to adjust the number of bits in order to make the number of bits of a chroma pixel sample value of the high frequency region obtained through frequency conversion identical with the number of bits of a chroma pixel sample value before frequency conversion since the number of bits of the chroma pixel sample value of the high frequency region obtained through frequency conversion is different from the number of bits of the chroma pixel sample value before frequency conversion. In particular, since a user does not sensitively recognize the high frequency region, when a sample value is great, a difference of the high frequency region recognized by the user may not be great according to a difference in the size of the sample value. That is, although there is a loss in the sample value, the user may hardly recognize the deterioration of image quality due to the loss. Thus, unequal mapping such as 2:1, 3:1, and 4:1 mapping within a range having a great absolute value of a sample value possible in the high frequency region may cause loss in some data, whereas the number of bits used may be reduced. Since there is no high probability that a sample value of a high frequency has a great size, a data loss probability is also low as much. Even if a data loss occurs, the user may hardly recognize the data loss.

The encoder 13 may encode the obtained sample value. In detail, the encoder 13 may entropy encode image data including the sample value and generate the image data.

Figure 2B:
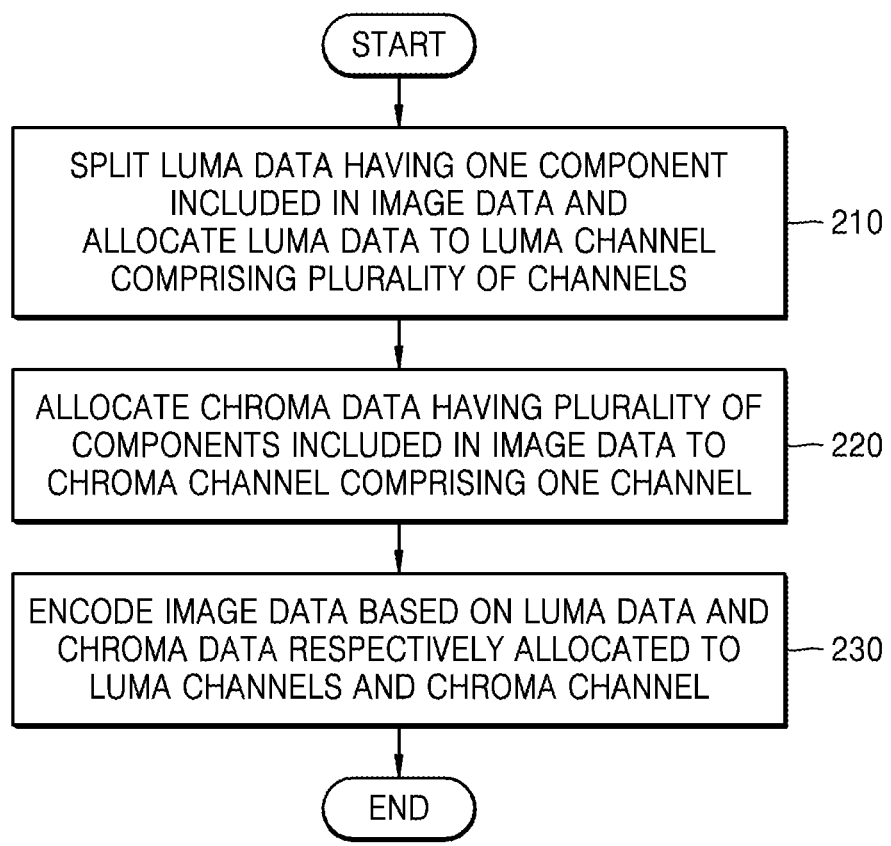
FIG. 2B is a flowchart of an encoding method according to an embodiment of the present disclosure.

FIG. 2B is a flowchart of an encoding method according to an embodiment of the present disclosure.

In operation 210, the encoding apparatus 10 may receive image data. For example, the encoding apparatus 10 may receive YUV 4:2:0 format image data. The encoding apparatus 10 may split luma data having one component included in the received image data and allocate the luma data to luma channel comprising a plurality of channels.

In operation 220, the encoding apparatus 10 may allocate chroma data having a plurality of components included in the image data to a chroma channel comprising one channel.

In operation 230, the encoding apparatus 10 may encode the image data based on the luma data and the chroma data respectively allocated to the luma channels and the chroma channel.

Figure 2C:
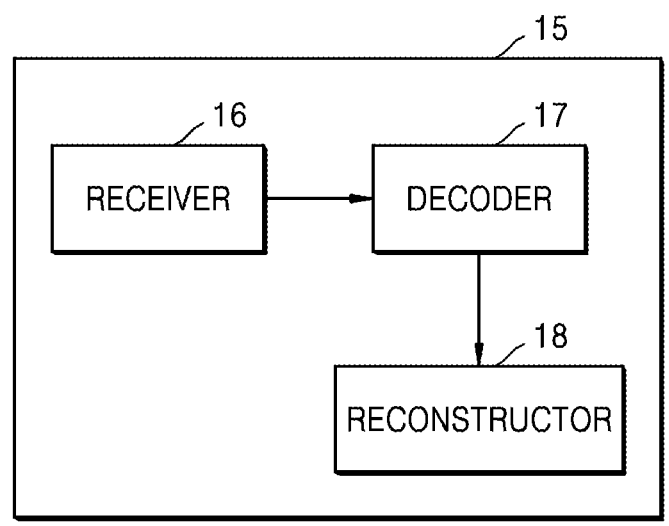
FIG. 2C is a block diagram of a decoding apparatus according to an embodiment of the present disclosure.

FIG. 2C is a block diagram of a decoding apparatus 15 according to an embodiment of the present disclosure.

Referring to FIG. 2C, the decoding apparatus 15 may include a receiver 16, a decoder 17, and a reconstructor 18.

The receiver 16 may receive a bitstream including encoded image information.

The decoder 17 may decode an image based on the encoded image information. The decoder 17 may decode the image based on the encoded image information, thereby obtaining luma data and chroma data. The decoder 17 may perform a function of the decoding apparatus 2 during a process of decoding the encoded image information.

The decoder 17 may decode the image by using independent quantization parameters with respect to luma channels comprising a plurality of channels.

Luma data obtained from luma channels may correspond to luma data having one component that is split into luma data of a low frequency region and luma data of a high frequency region and is allocated to each of a plurality of luma channels in the encoding apparatus 1.

The decoder 17 may determine one second portion range including a sample value of the high frequency region obtained before frequency conversion among a plurality of second portion ranges corresponding to a second allowable range of the sample value of the high frequency region. In this regard, the plurality of second portion ranges may be generated by dividing the second allowable range into several sections. In this regard, when the second allowable range is divided into several sections, the second allowable range may be split not equally but unequally. When the second allowable range is unequally split, in particular, in a section in which a size of a sample value is greater than a certain size, a size of the section may be smaller than a size of a section equal to or smaller than the certain size.

When an absolute value of the sample value of the high frequency region is equal to or greater than a predetermined value, the decoder 17 may correspondingly map values of one first portion range (hereinafter referred to as an inverse mapping range) of a plurality of first portion ranges corresponding to a first allowable range greater than or equal to the first allowable range to values of the determined second portion range. In this regard, the inverse mapping range may be smaller than the determined second portion range. Thus, the values of the determined second portion range may be mapped to the values of the inverse mapping range at 1:2, 1:3, and 1:4 ratios other than a 1:1 ratio. In this regard, mapped data may be data generated by being decoded (in particular, inverse frequency conversion).

The reconstructor 18 may obtain luma data allocated to the luma channels comprising the plurality of channels and chroma data allocated to a chroma channel comprising one channel from data generated by decoding the image by the decoder 17.

The reconstructor 18 may merge the obtained luma data of the luma channels into the luma data having one component. In this regard, the luma channels may include two channels. The reconstructor 18 may merge two pieces of luma data into the luma data having one component.

The obtained luma data of the luma channels may be encoded luma data that is split into two pieces of luma data having one component in a spatial domain and is allocated to each of two channels in the encoding apparatus 10.

The obtained luma data of the luma channels may be luma data that is split into two pieces of luma data in a frequency region and is allocated to each of the luma channels in the encoding apparatus 10. In this case, the reconstructor 18 may merge the two pieces of luma data split in the frequency region into one pieces of luma data. The obtained luma data of the luma channels may correspond to luma data having one component that is split into the luma data of the low frequency region and the luma data of the high frequency region and is allocated to each of the luma channels in the encoding apparatus 10.

The reconstructor 18 may split the obtained chroma data of the chroma channel into chroma data having a plurality of components. The chroma data may include two chroma components. The reconstructor 18 may split the chroma data having two chroma components into chroma data each having each chroma component in one spatial domain.

The reconstructor 18 may obtain the merged and generated luma data having one component and the split chroma data having the plurality of components. In this regard, the obtained luma data and chroma data may be YUV 4:2:0 format image data.

The reconstructor 18 may reconstruct an image based on the obtained luma data having one component and chroma data having the plurality of components.

Figure 2D:
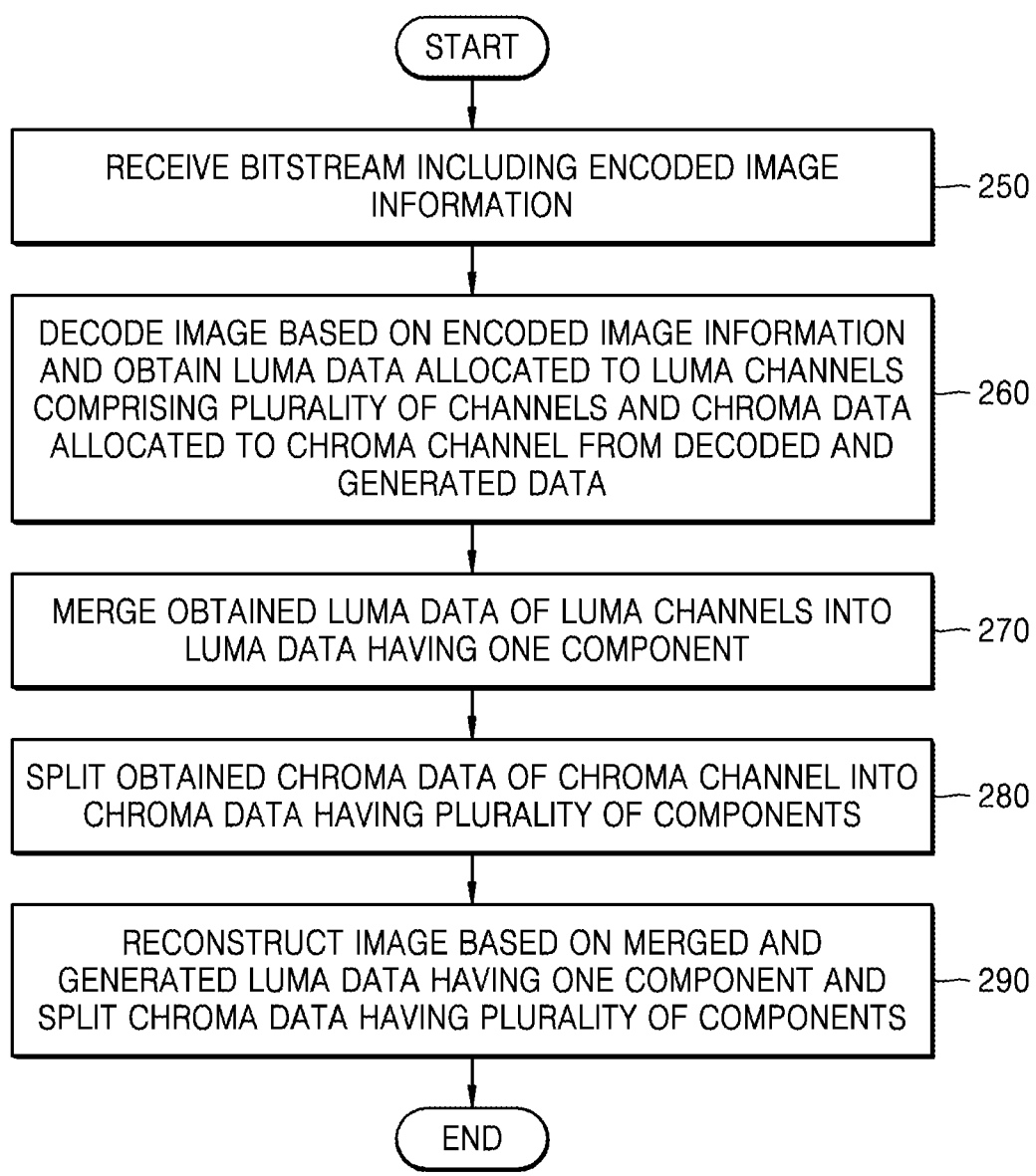
FIG. 2D is a flowchart of a decoding method according to an embodiment of the present disclosure.

FIG. 2D is a flowchart of a decoding method according to an embodiment of the present disclosure.

Referring to FIG. 2D, in operation 250, the decoding apparatus 15 may receive a bitstream including encoded image information.

In operation 260, the decoding apparatus 15 may decode an image based on the encoded image information and obtain luma data allocated to luma channels comprising a plurality of channels and chroma data allocated to a chroma channel from the decoded and generated data.

In operation 270, the decoding apparatus 15 may merge the obtained luma data of the luma channels into luma data having one component.

In operation 280, the decoding apparatus 15 may split the obtained chroma data of the chroma channel into chroma data having a plurality of components.

In operation 290, the decoding apparatus 15 may reconstruct an image based on the merged and generated luma data having one component and the split chroma data having the plurality of components.

Figure 3A:
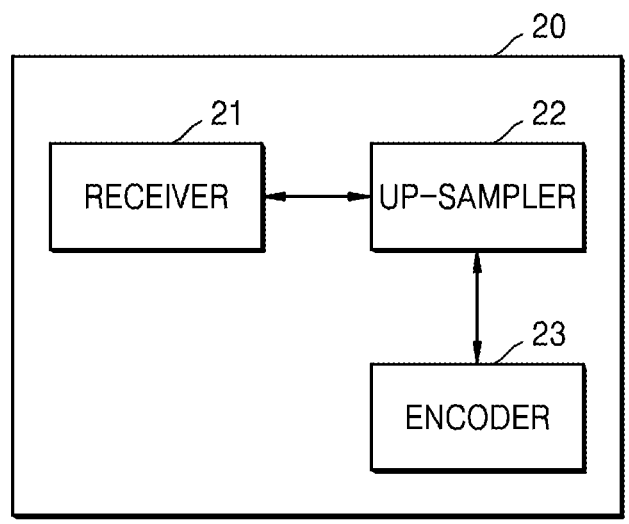
FIG. 3A is a block diagram of an encoding apparatus according to an embodiment of the present disclosure.

FIG. 3A is a block diagram of an encoding apparatus 20 according to an embodiment of the present disclosure.

The encoding apparatus 20 according to an embodiment of the present disclosure may receive (obtain) image data, convert the chroma data by allocating at least one chroma component located at a plurality of lines in chroma data included in the received (obtained) image data to an empty region of one of the plurality of lines, allocate predetermined values to other lines except for the one line based on the converted chroma data, and up-sample the received data, thereby improving encoding efficiency.

That is, a size of encoded image information generated by locating chroma components included in chroma data of a plurality of lines at one line and allocating predetermined values to other lines may be minimized.

Referring to FIG. 3A, the encoding apparatus 20 may include a receiver 21, an up-sampler 22, and an encoder 23.

The receiver 21 may receive image data. In detail, the image data may be YUV 4:2:0 format image data.

The up-sampler 22 may up-sample the image data received by the receiver 21. The up-sampler 22 may convert the YUV 4:2:0 format image data into YUV 4:4:4 format image data. The up-sampler 22 may convert the YUV 4:2:0 format image data into YUV 4:2:2 format image data and convert the converted YUV 4:2:2 format image data into the YUV 4:2:0 format image data.

The up-sampler 22 may convert the chroma data by allocating at least one chroma component located at a plurality of lines in chroma data included in the received image data to an empty region of one of the plurality of lines. The up-sampler 22 may allocate predetermined values to other lines except for the one line based on the converted chroma data.

That is, the up-sampler 22 may reduce a size of the chroma data included in the image data to concentrate the chroma data on one line and copy and fill an average of at least one of components included in the chroma data or the components included in the chroma data in other empty regions when converting the YUV 4:2:0 format image data into the YUV 4:4:4 format image data in order to minimize transmission of data, thereby performing up-sampling on the image data.

The encoder 23 may encode the up-sampled image data. In this regard, the encoder 23 may perform a function of the encoding apparatus 1 during a process of encoding the image data.

Figure 3B:
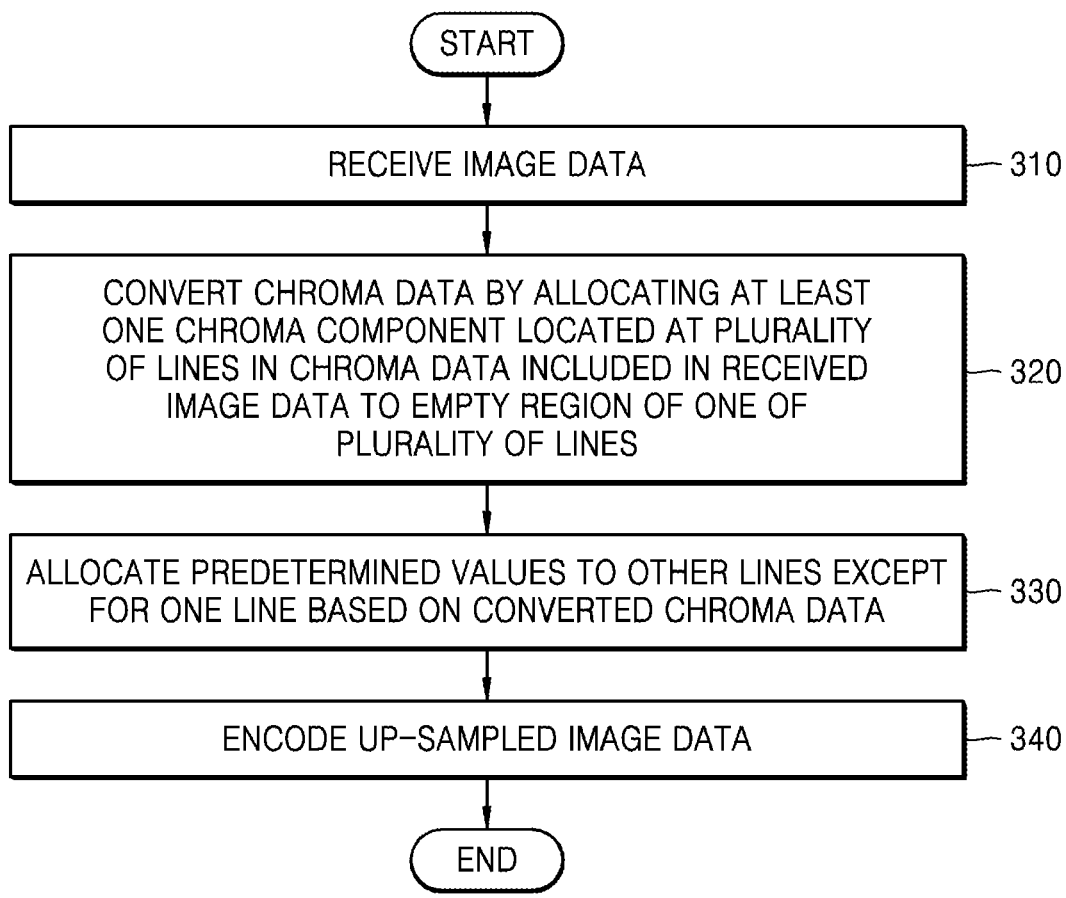
FIG. 3B is a flowchart of an encoding method according to an embodiment of the present disclosure.

FIG. 3B is a flowchart of an encoding method according to an embodiment of the present disclosure.

Referring to FIG. 3B, in operation 310, the receiver 21 may receive image data. In this regard, the received image data may be YUV 4:2:0 format image data.

In operation 320, the encoding apparatus 20 may convert chroma data by allocating at least one chroma component located at a plurality of lines in the chroma data included in the received image data to an empty region of one of the plurality of lines.

In operation 330, the encoding apparatus 20 may up-sample the image data by allocating predetermined values to other lines except for the one line based on the converted chroma data.

In operation 340, the encoding apparatus 20 may encode the up-sampled image data. In detail, the encoding apparatus 20 may encode the chroma data in which the predetermined values are allocated to other lines except for the one line.

Figure 3C:
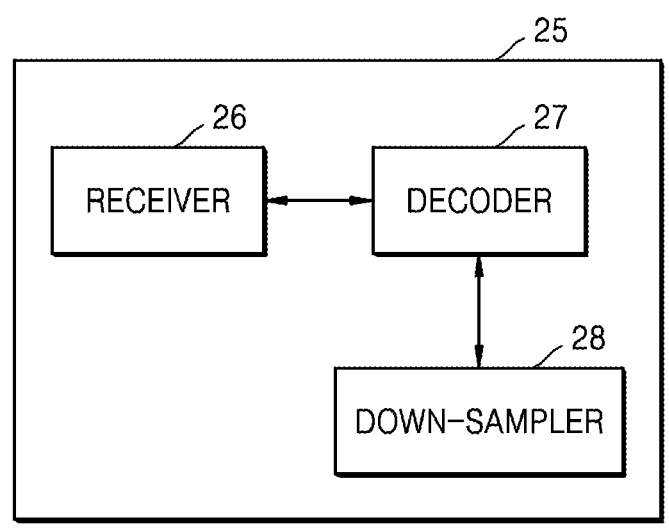
FIG. 3C is a block diagram of a decoding apparatus according to an embodiment of the present disclosure.

FIG. 3C is a block diagram of a decoding apparatus 25 according to an embodiment of the present disclosure.

Referring to FIG. 3C, the decoding apparatus 25 according to an embodiment of the present disclosure includes a receiver 26, a decoder 27, and a down-sampler 28.

The receiver 26 may receive a bitstream including encoded image information. In this regard, the bitstream may include image information encoded by converting chroma data by allocating at least one chroma component located at a plurality of lines in chroma data included in image data to an empty region of one of the plurality of lines and allocating predetermined values to other lines except for the one line based on the converted chroma data.

The decoder 27 may decode an image based on the encoded image information received by the receiver 26. In this regard, the decoder 27 may perform a function of the decoding apparatus 2 during a process of decoding the encoded image information.

The down-sampler 28 may obtain luma data and chroma data that are generated by decoding the image in the decoder 27. In this regard, image data including the luma data and the chroma data may be YUV 4:4:4 format image data.

In detail, the down-sampler 28 may convert the chroma data by allocating at least one chroma component located at one line in the obtained chroma data to a plurality of lines including the one line. In this regard, the converted chroma data may be YUV 4:2:0 format image data. The down-sampler 28 may reconstruct an image based on the luma data and the converted chroma data. In particular, the down-sampler 28 may inversely perform a function of the up-sampler 22.

Figure 3D:
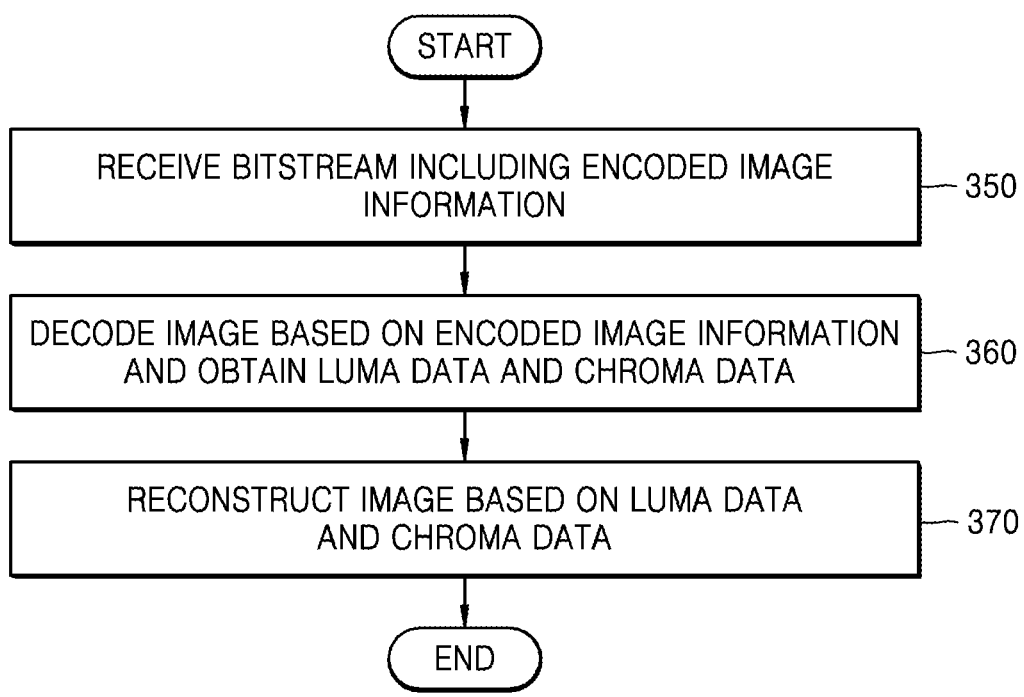
FIG. 3D is a flowchart of a decoding method according to an embodiment of the present disclosure.

FIG. 3D is a flowchart of a decoding method according to an embodiment of the present disclosure.

Referring to FIG. 3D, in operation 350, the decoding apparatus 25 may receive a bitstream including encoded image information. In this regard, the bitstream may include image information encoded by converting chroma data by allocating at least one chroma component located at a plurality of lines in chroma data included in image data to an empty region of one of the plurality of lines and allocating predetermined values to other lines except for the one line based on the converted chroma data.

In operation 360, the decoding apparatus 25 may decode an image based on the encoded image information received by the receiver 26 and obtain luma data and chroma data that are generated by decoding the image. In this regard, image data including the luma data and the chroma data may be YUV 4:4:4 format image data.

In operation 370, the decoding apparatus 25 may reconstruct the image based on the chroma data and the luma data. In this regard, the chroma data and the luma data may be image data up-sampled by converting chroma data by allocating at least one chroma component located at a plurality of lines in chroma data included in image data to an empty region of one of the plurality of lines and allocating predetermined values to other lines except for the one line based on the converted chroma data.

The decoding apparatus 25 may convert the chroma data by allocating at least one chroma component located at one line in the obtained chroma data to a plurality of lines including the one line. The decoding apparatus 25 may reconstruct an image based on the converted chroma data. In detail, the decoding apparatus 25 may reconstruct the image based on the obtained luma data and the converted chroma data. The image data including the luma data and the converted chroma data may be YUV 4:2:0 format image data. In detail, the decoding apparatus 25 may reconstruct the image by inversely performing a function of the up-sampler 22. When the encoding apparatus 20 performs up-sampling, the encoding apparatus 20 inputs image data, up-samples the input image data, and generates the up-sampled image data. Inversely performing these functions means inputting up-sampled image data, processing the input up-sampled image data, and outputting image data.

Figure 4A:
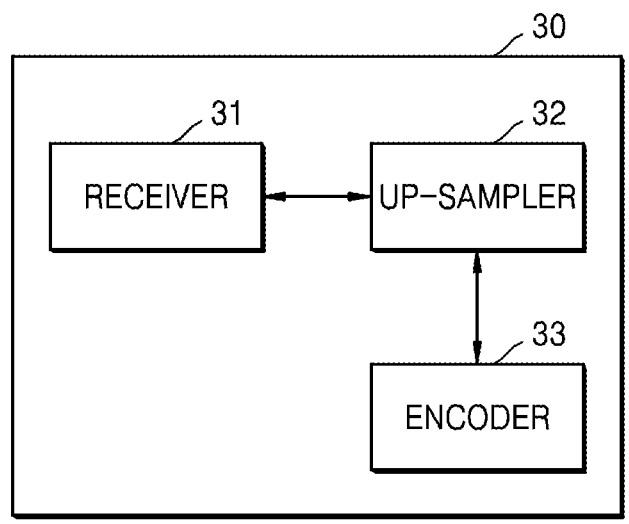
FIG. 4A is a block diagram of an encoding apparatus according to an embodiment of the present disclosure.

FIG. 4A is a block diagram of an encoding apparatus 30 according to an embodiment of the present disclosure.

If the encoding apparatus 20 receives image data, the encoding apparatus 20 may up-sample the image data, allocate each of at least one chroma component located in a region that is not up-sampled in one line of chroma data included in the up-sampled image data to a different region of the line from the region in which each of the at least one chroma component is located such that a plurality of chroma components located in the region that is not up-sampled are adjacent to each other in the line and may encode chroma data including the allocated chroma component. The encoding apparatus 30 may not sparsely locate chroma components included in chroma data at odd columns or even columns but may continuously locate the chroma components, thereby efficiently encoding image data. For example, on the premise that YUV 4:2:0 format data is input to the encoding apparatus 30 (in particular, an encoder 33 included in the encoding apparatus 30), the encoding apparatus 30 may convert chroma data such that three chroma pixels corresponding to three luma pixels located in front among six luma pixels located at one line are continuously located from left, may not encode chroma data corresponding to three luma pixels located behind, and may encode only the three luma pixels. That is, unnecessary chroma data may not be encoded, thereby increasing encoding efficiency.

The encoding apparatus 30 (in particular, an encoder 33 included in the encoding apparatus 30) may not use an index color history (ICH) mode with respect to the three luma pixels located behind. This will be described in detail with reference to FIG. 12B below.

Referring to FIG. 4A, the encoding apparatus 30 may include a receiver 31, an up-sampler 32, and an encoder 33.

The receiver 31 may receive image data. In detail, the received image data may be YUV 4:2:0 format image data.

The up-sampler 32 may up-sample the image data. For example, the up-sampler 32 may convert the YUV 4:2:0 format image data into YUV 4:4:4 format image data. In particular, the up-sampler 32 may not convert luma data included in the image data but may convert chroma data included in the image data.

The encoder 33 may allocate each of at least one chroma component located in a region that is not up-sampled in one line of chroma data included in the up-sampled image data to a different region of the line from the region in which each of the at least one chroma component is located such that a plurality of chroma components located in the region that is not up-sampled are adjacent to each other in the line and may encode chroma data including the allocated chroma component. The encoder 33 may perform a function of the encoding apparatus 1 during a process of encoding the chroma data including the allocated chroma component.

Figure 4B:
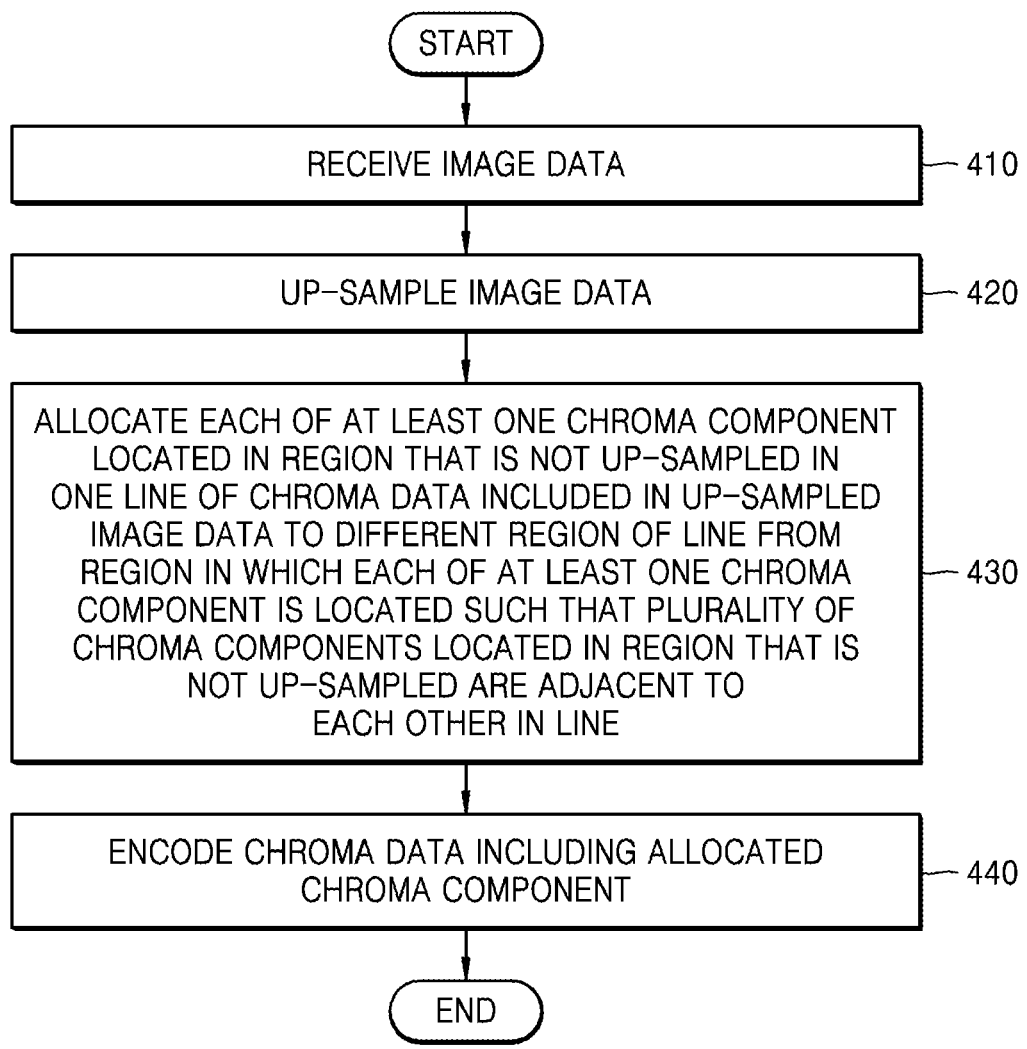
FIG. 4B is a flowchart of an encoding method according to an embodiment of the present disclosure.

FIG. 4B is a flowchart of an encoding method according to an embodiment of the present disclosure.

Referring to FIG. 4B, in operation 410, the encoding apparatus 30 may receive image data. In this regard, the received image data may be YUV 4:2:0 format image data.

In operation 420, the encoding apparatus 30 may up-sample the image data. For example, the up-sampler 32 may convert the YUV 4:2:0 format image data into YUV 4:4:4 format image data.

In operation 430, the encoding apparatus 30 may allocate each of at least one chroma component located in a region that is not up-sampled in one line of chroma data included in the up-sampled image data to a different region of the line from the region in which each of the at least one chroma component is located such that a plurality of chroma components located in the region that is not up-sampled are adjacent to each other in the line and may encode chroma data including the allocated chroma component.

In operation 440, the encoding apparatus 30 may encode chroma data including the allocated chroma component.

Figure 4C:
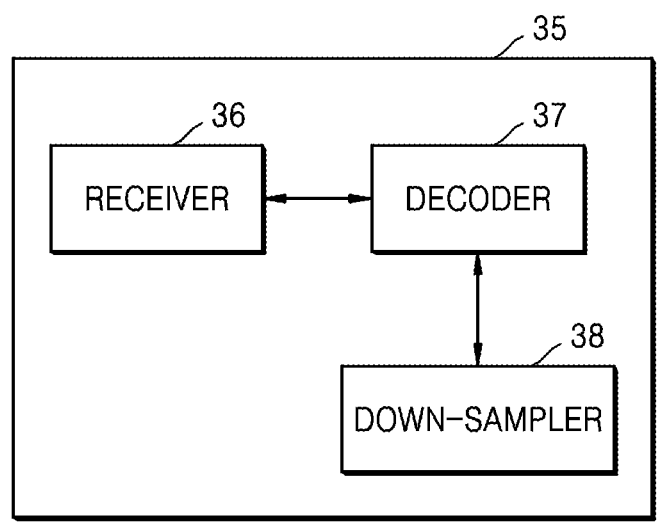
FIG. 4C is a block diagram of a decoding apparatus according to an embodiment of the present disclosure.

FIG. 4C is a block diagram of a decoding apparatus 35 according to an embodiment of the present disclosure.

Referring to FIG. 4C, decoding apparatus 35 may include a receiver 36, a decoder 37, and a down-sampler 38.

The receiver 36 may receive a bitstream including encoded image information. In this regard, the bitstream may include image information in which image data is up-sampled, each of at least one chroma component located in a region that is not up-sampled in one line of chroma data included in the up-sampled image data is allocated to a different region of the line from the region in which each of the at least one chroma component is located such that a plurality of chroma components located in the region that is not up-sampled are adjacent to each other in the line and chroma data including the allocated chroma component and luma data included in the image data are encoded.

The decoder 37 may decode an image based on the encoded image information received by the receiver 36. The decoder 37 may decode the image to generate chroma data and luma data. In this regard, the decoder 37 may perform a function of the decoding apparatus 2. In this regard, output data may be YUV 4:4:4 format image data.

In addition, the decoder 37 may convert the chroma data by allocating at least one chroma component located at one line in the chroma data to a region different from a region in which the at least one chroma component of the one line is located. In this regard, the region different from the region in which the at least one chroma component of the one line is located may be a region that is not down-sampled. In detail, the decoder 37 may inversely perform a process of allocating each of at least one chroma component located in a region that is not up-sampled in one line of chroma data included in the up-sampled image data to a different region of the line from the region in which each of the at least one chroma component is located such that a plurality of chroma components located in the region that is not up-sampled are adjacent to each other in the line in the encoder 33.

The down-sampler 38 may down-sample the converted chroma data to obtain image data. That is, chroma data generated by down-sampling the converted chroma data and the chroma data generated by decoding the image in the decoder 37. In this regard, the image data may be YUV 4:2:0 format image data or YUV 4:2:2 format image data. The down-sampler 38 may reconstruct an image by using the image data.

Figure 4D:
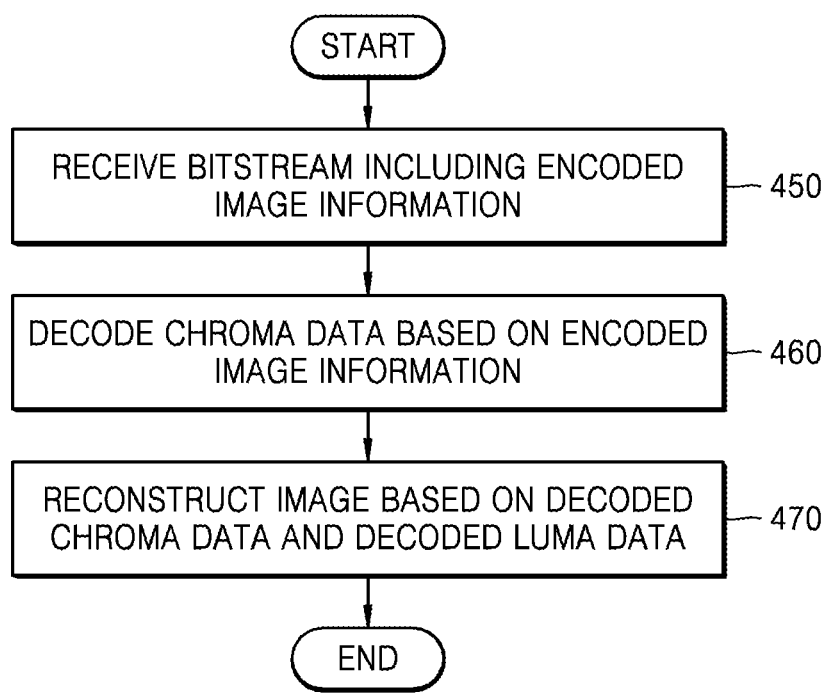
FIG. 4D is a flowchart of a decoding method according to an embodiment of the present disclosure.

FIG. 4D is a flowchart of a decoding method according to an embodiment of the present disclosure.

Referring to FIG. 4D, in operation 450, the decoding apparatus 35 may receive a bitstream including encoded image information. In this regard, the bitstream may include image information in which image data is up-sampled, each of at least one chroma component located in a region that is not up-sampled in one line of chroma data included in the up-sampled image data is allocated to a different region of the line from the region in which each of the at least one chroma component is located such that a plurality of chroma components located in the region that is not up-sampled are adjacent to each other in the line and chroma data including the allocated chroma component and luma data included in the image data are encoded.

In operation 460, the decoding apparatus 35 may decode chroma data based on the encoded image information. The decoding apparatus 35 may perform a function of the decoding apparatus 2.

In operation 470, the decoding apparatus 35 may reconstruct an image based on the decoded chroma data and decoded luma data. In detail, the decoding apparatus 35 may convert the chroma data by allocating at least one chroma component located at one line in the decoded chroma data to a different region of the one line. In this regard, the different region of the one line may be a region that is not down-sampled. The decoding apparatus 35 may reconstruct the image based on the converted chroma data and the decoded chroma data.

Figure 5A:
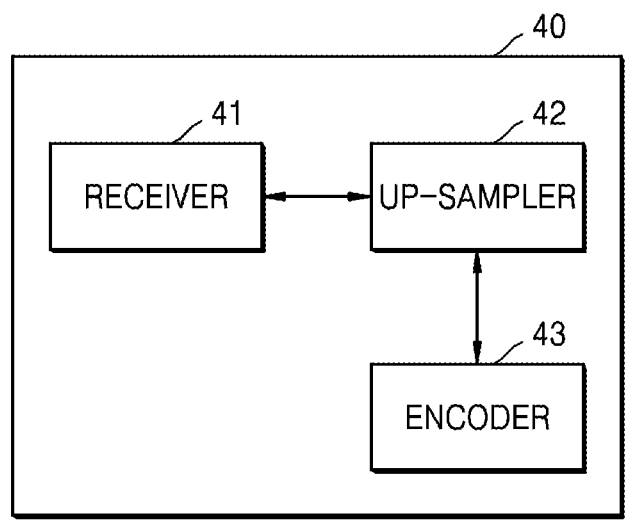
FIG. 5A is a block diagram of an encoding apparatus according to an embodiment of the present disclosure.

FIG. 5A is a block diagram of an encoding apparatus 40 according to an embodiment of the present disclosure.

Referring to FIG. 5A, the encoded apparatus 40 may receive image data, up-sample chroma data included in the received image data, and encode chroma data of one line among odd lines or even lines in a plurality of lines of the up-sampled chroma data.

When the image data is YUV 4:2:0 format image data, the chroma data included in the image data may include information regarding a chroma component only in odd lines or even lines. For example, when the chroma data includes the information regarding the chroma component in odd lines, the chroma data may not include the information regarding the chroma component in even lines.

Although the up-sampled chroma data looks like including the information regarding the chroma component in all regions, the information regarding the chroma component of an actually up-sampled region does not include significant information. If encoding is not performed on the up-sampled region, a waste of unnecessary number of bits may be prevented.

For example, when the chroma data includes significant information regarding the chroma component in odd lines, the encoding apparatus 40 may encode chroma data of odd lines and may not encode a chroma component of even lines that is an up-sampled region.

The encoding apparatus 40 may include a receiver 41, an up-sampler 42, and an encoder 43.

The receiver 41 may receive image data. In this regard, the received image data may be YUV 4:2:0 format image data.

The up-sampler 42 may up-sample chroma data included in the image data. For example, the up-sampler 42 may convert the YUV 4:2:0 format image data included in the image data into YUV 4:4:4 format image data.

The encoder 43 may selectively encode chroma data of one of odd lines or even lines in a plurality of lines included in the up-sampled chroma data. For example, when chroma data included in the YUV 4:2:0 format image data includes information regarding a chroma component only in odd lines, the encoder 43 may encode chroma data of odd lines among the up-sampled image data and may not encode chroma data of even lines.

Figure 5B:
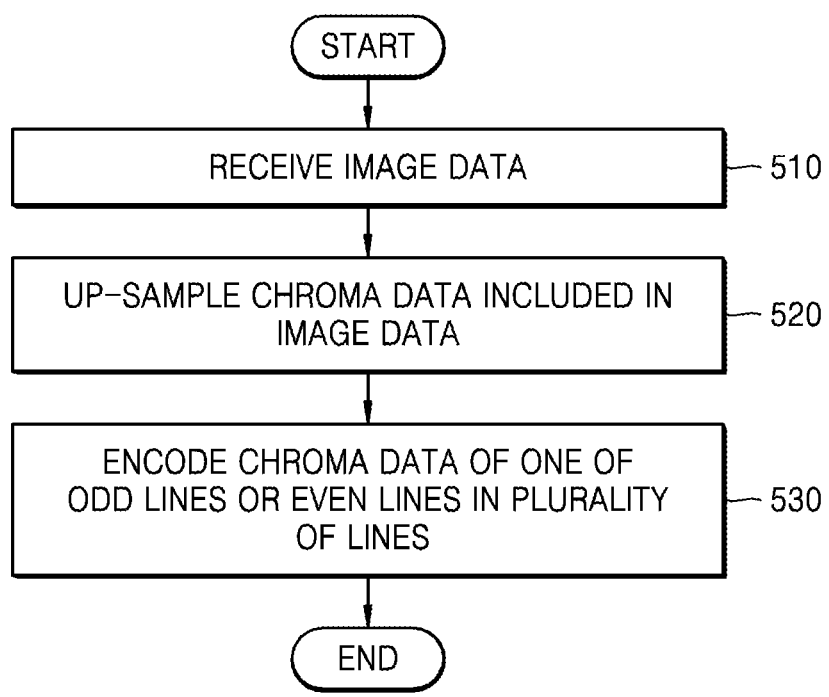
FIG. 5B is a flowchart of an encoding method according to an embodiment of the present disclosure.

FIG. 5B is a flowchart of an encoding method according to an embodiment of the present disclosure.

Referring to FIG. 5B, in operation 510, the encoding apparatus 40 may receive image data. In this regard, the received image data may be YUV 4:2:0 format image data.

In operation 520, the encoding apparatus 40 may up-sample chroma data included in the image data. For example, the up-sampler 42 may convert the YUV 4:2:0 format image data into YUV 4:4:4 format image data.

In operation 530, the encoding apparatus 40 may encode chroma data of one of odd lines or even lines of a plurality of lines.

Figure 5C:
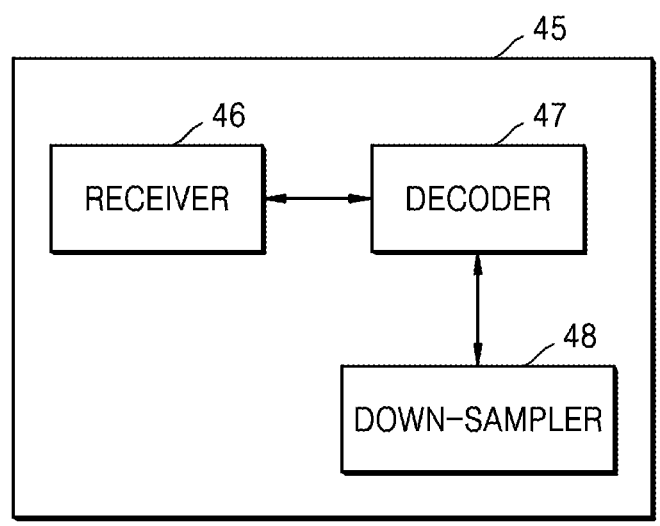
FIG. 5C is a block diagram of a decoding apparatus according to an embodiment of the present disclosure.

FIG. 5C is a block diagram of a decoding apparatus 45 according to an embodiment of the present disclosure.

Referring to FIG. 5C, the decoding apparatus 45 may include a receiver 46, a decoder 47, and a down-sampler 48.

The receiver 46 may receive a bitstream including encoded image information. In this regard, the bitstream may include image information in which chroma data included in image data is up-sampled and chroma data of one of odd lines or even lines in a plurality of lines among the up-sampled chroma data is encoded.

The decoder 47 may perform a function of the decoding apparatus 2. However, unlike the decoding apparatus 2, the decoder 47 may not decode all lines and may decode one of even lines or odd lines in a plurality of lines included in an image based on the encoded image information. In this regard, the decoder 47 may decode the encoded image information and generate chroma data and luma data.

The down-sampler 48 may down-sample the chroma data generated by decoding the encoded image information. For example, the down-sampler 48 may convert the chroma data generated by decoding the encoded image information into chroma data included in YUV 4:2:0 format image data. The down-sampler 48 may reconstruct an image based on the luma data generated by decoding the encoded image information and the down-sampled chroma data.

Figure 5D:
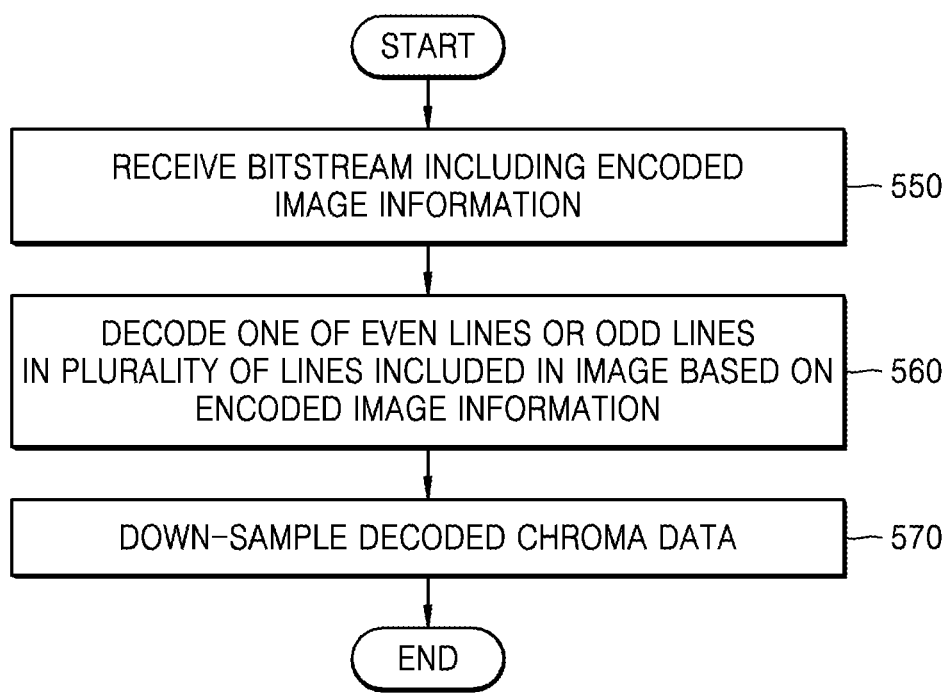
FIG. 5D is a flowchart of a decoding method according to an embodiment of the present disclosure.

FIG. 5D is a flowchart of a decoding method according to an embodiment of the present disclosure.

Referring to FIG. 5D, in operation 550, the decoding apparatus 45 may receive a bitstream including encoded image information. In this regard, the bitstream may include image information in which chroma data included in image data is up-sampled and chroma data of one of odd lines or even lines in a plurality of lines among the up-sampled chroma data is encoded.

In operation 560, the decoding apparatus 45 may decode one of even lines or odd lines in a plurality of lines included in an image based on the encoded image information.

In operation 570, the decoding apparatus 45 may down-sample chroma data generated by decoding the one of even lines or odd lines. The decoding apparatus 45 may obtain image data based on the down-sampled chroma data and luma data generated by decoding the one of even lines or odd lines. The decoding apparatus 45 may reconstruct an image based on the obtained image data.

Figure 6A:
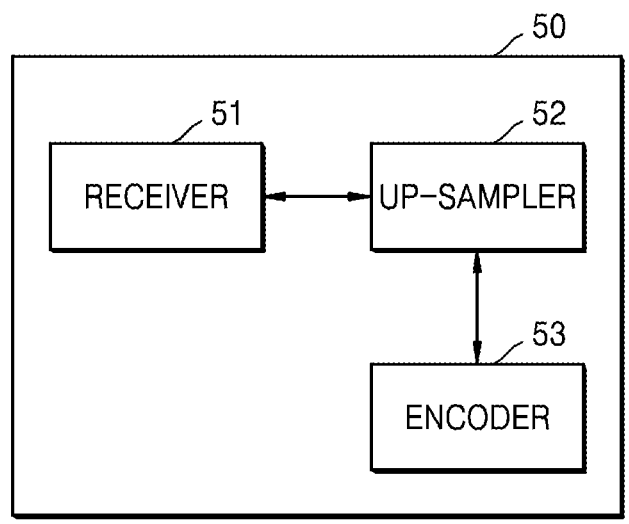
FIG. 6A is a block diagram of an encoding apparatus according to an embodiment of the present disclosure.

FIG. 6A is a block diagram of an encoding apparatus 50 according to an embodiment of the present disclosure.

Referring to FIG. 6A, the encoding apparatus 50 may include a receiver 51, an up-sampler 52, and an encoder 53.

The receiver 51 may receive image data. For example, the image data may be YUV 4:2:0 format image data.

The up-sampler 52 may allocate at least one of a plurality of chroma components located at one line of a plurality of lines of chroma data included in the image data received by the receiver 51 to a different line from the line.

The up-sampler 52 may obtain a sample value that is to be allocated to an empty region of the line based on a sample value of the chroma component allocated to the different line, thereby generating up-sampled image data.

The encoder 53 may encode the up-sampled image data. The encoder 53 may perform a function of the encoding apparatus 1.

Figure 6B:
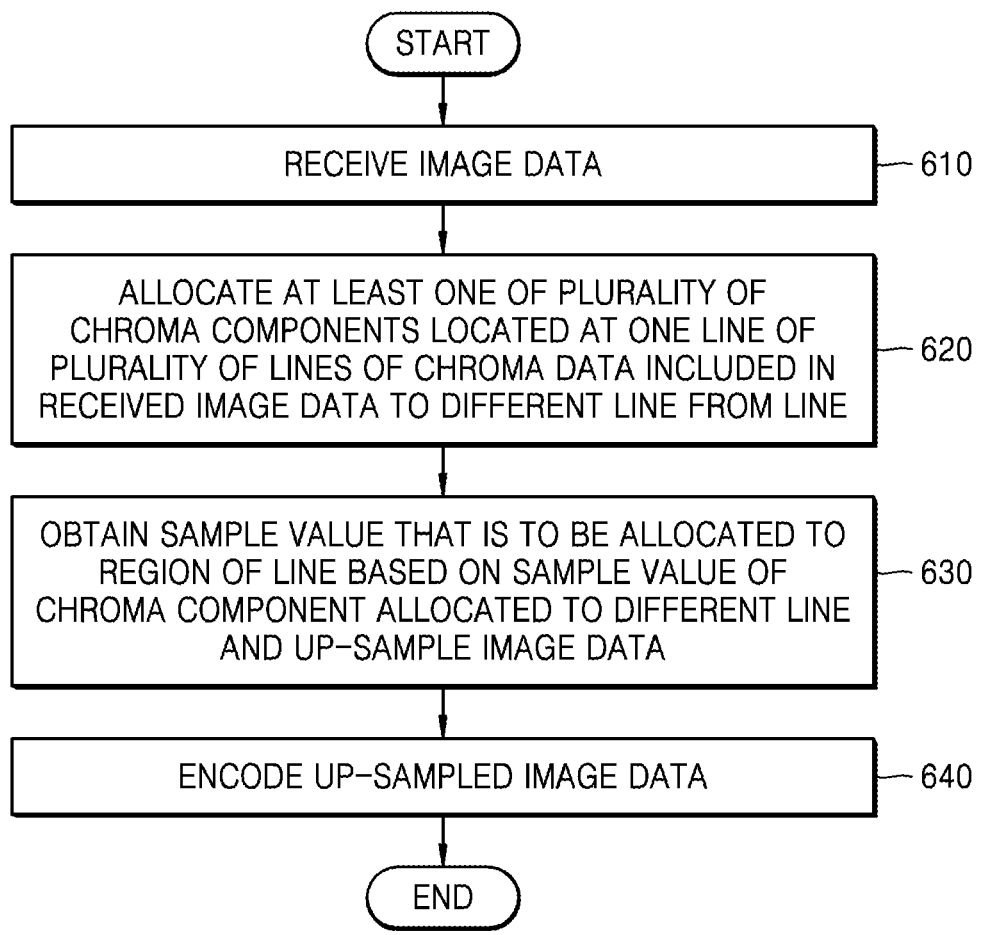
FIG. 6B is a flowchart of an encoding method according to an embodiment of the present disclosure.

FIG. 6B is a flowchart of an encoding method according to an embodiment of the present disclosure.

Referring to FIG. 6B, in operation 610, the encoding apparatus 50 may receive image data. In this regard, the image data may be YUV 4:2:0 format image data.

In operation 620, the encoding apparatus 50 may allocate at least one of a plurality of chroma components located at one line of a plurality of lines of chroma data included in the received image data to a different line from the line.

In operation 630, the encoding apparatus 50 may obtain a sample value that is to be allocated to an empty region of the line based on a sample value of the chroma component allocated to the different line, thereby up-sampling the image data.

In operation 640, the encoding apparatus 50 may encode the up-sampled image data. In detail, the encoding apparatus 50 may allocate at least one of a plurality of chroma components located at one line of a plurality of lines of chroma data included in the received image data to a different line from the line and obtain a sample value that is to be allocated to an empty region of the line based on a sample value of the allocated chroma component, thereby up-sampling image data, and encode converted chroma data and luma data included in the image data.

Figure 6C:
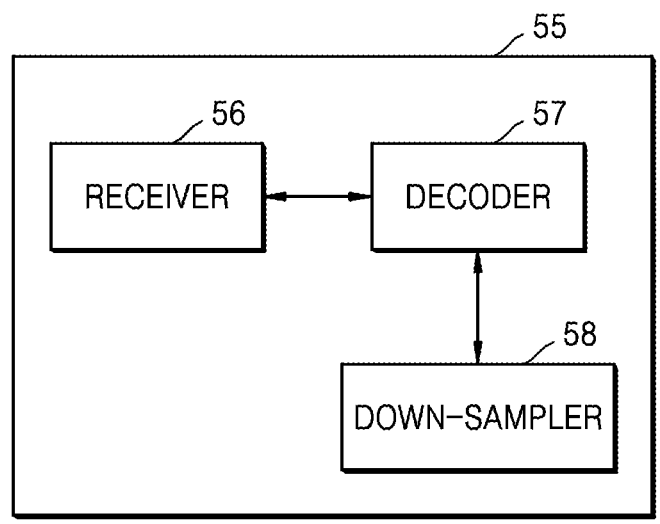
FIG. 6C is a block diagram of a decoding apparatus according to an embodiment of the present disclosure.

FIG. 6C is a block diagram of a decoding apparatus 55 according to an embodiment of the present disclosure.

Referring to FIG. 6C, the decoding apparatus 55 may include a receiver 56, a decoder 57, and a down-sampler 58.

The receiver 56 may receive a bitstream including encoded image information. In this regard, the bitstream may include image information in which at least one of a plurality of chroma components located at one line of a plurality of lines of chroma data included in the image data is allocated to a different line from the line, a sample value that is to be allocated to an empty region of the line is obtained based on a sample value of the chroma component allocated to the different line, and image data including the obtained sample value is encoded.

The decoder 57 may decode an image based on the encoded image information. The decoder 57 may generate luma data and chroma data by decoding the image. In this regard, the luma data and the chroma data may be YUV 4:4:4 format image data. The decoder 57 may perform a function of the decoding apparatus 2.

The down-sampler 58 may reconstruct an image based on the chroma data and the luma data obtained in the decoder 57.

The down-sampler 58 may obtain a sample value of one chroma component that is to be allocated to one line based on a plurality of sample values that are to be allocated to one line of a plurality of lines in chroma data included in image data generated by decoding the image in the decoder 57.

The down-sampler 58 may allocate the chroma component allocated to the one line to a different line from the one line. The down-sampler 58 may obtain chroma data converted based on the chroma component allocated to the one line. That is, the down-sampler 58 may obtain the luma data generated by decoding the image in the decoder 57 and the converted chroma data. The down-sampler 58 may reconstruct an image based on the image data including the obtained luma data and the converted chroma data.

In detail, the down-sampler 58 may inversely perform a function of the up-sampler 52.

Figure 6D:
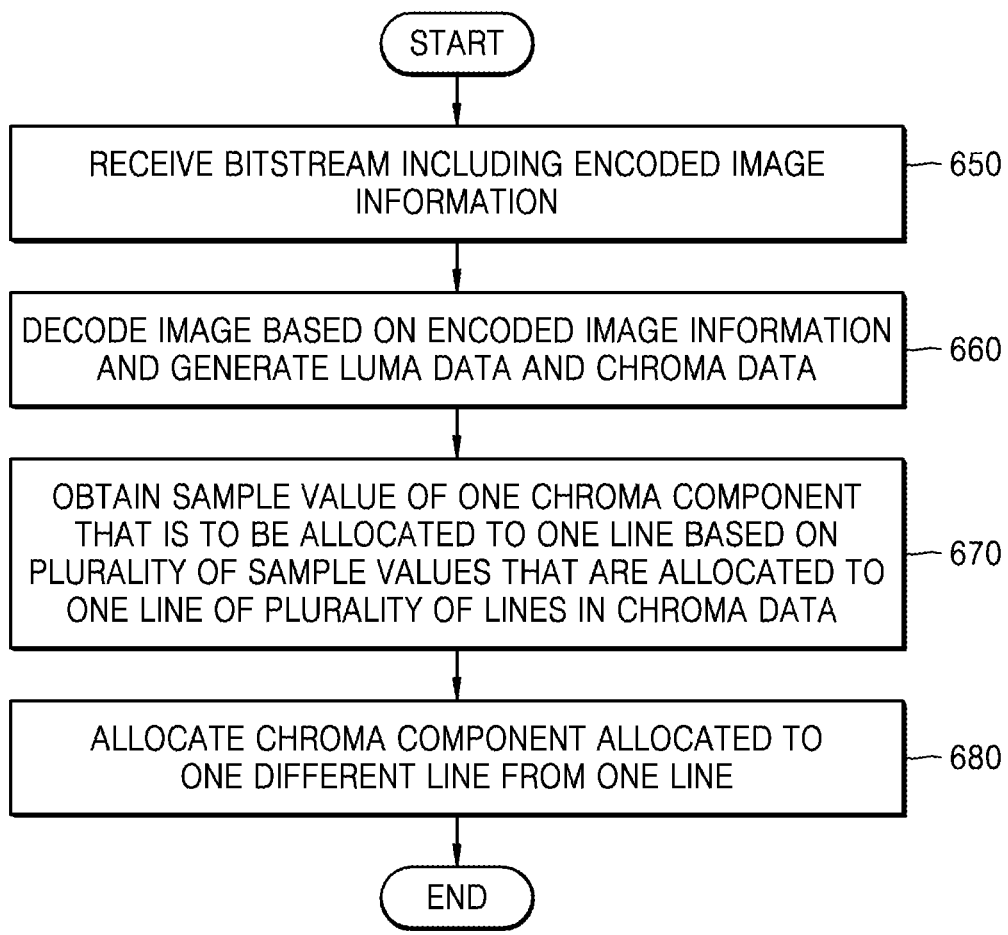
FIG. 6D is a flowchart of a decoding method according to an embodiment of the present disclosure.

FIG. 6D is a flowchart of a decoding method according to an embodiment of the present disclosure.

Referring to FIG. 6D, in operation 650, the decoding apparatus 55 may receive a bitstream including encoded image information. In this regard, the bitstream may include image information in which at least one of a plurality of chroma components located at one line of a plurality of lines of chroma data included in the image data is allocated to a different line from the line, a sample value that is to be allocated to an empty region of the line is obtained based on a sample value of the chroma component allocated to the different line, and image data including the obtained sample value is encoded.

In operation 660, the decoding apparatus 55 may decode an image based on the encoded image information. The decoding apparatus 55 may generate luma data and chroma data by decoding the image. In this regard, the luma data and the chroma data may be YUV 4:4:4 format image data.

In operations 670 and 680, the decoding apparatus 55 may reconstruct an image based on the chroma data and the luma data obtained by decoding the image.

In operation 670, the decoding apparatus 55 may obtain a sample value of one chroma component that is to be allocated to one line based on a plurality of sample values that are to be allocated to one line of a plurality of lines in chroma data included in decoded image data.

In operation 680, the decoding apparatus 55 may allocate the chroma component allocated to the one line to a line different from the one line. The decoding apparatus 55 may obtain chroma data converted based on the chroma component allocated to the one line. That is, the decoding apparatus 55 may obtain the luma data generated by decoding the image and the converted chroma data. The decoding apparatus 55 may reconstruct an image based on the image data including the obtained luma data and the converted chroma data.

Figure 7A:
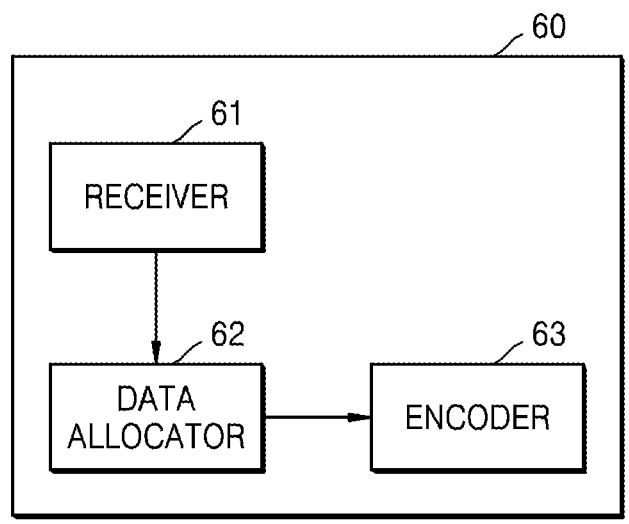
FIG. 7A is a block diagram of an encoding apparatus according to an embodiment of the present disclosure.

FIG. 7A is a block diagram of an encoding apparatus 60 according to an embodiment of the present disclosure.

The encoding apparatus 60 may receive image data having a plurality of components including chroma and luma components, allocate the received image data having the plurality of components including the chroma and luma components to each of a plurality of channels, and encode the image data having the plurality of components allocated to each of the plurality of channels. In this regard, the encoding apparatus 60 may encode the image data by using an independent quantization parameter with respect to each of the plurality of channels.

The encoding apparatus 60 may determine quantization parameters of other channels with respect to a quantization parameter of one channel and include an offset in a bitstream. For example, when a quantization parameter of a first channel is 10 and a quantization parameter of a second channel is 11, the encoding apparatus 60 may determine an offset of the second channel as 11−10=1 with respect to the first channel and include offset information in a bitstream. A decoding apparatus may determine a QP of a channel in a QP of a reference channel by using the offset included in the bitstream.

The encoding apparatus 60 may split luma data having one component into two pieces of luma data in a spatial domain, allocate the split luma data to two channels, and encode the luma data. In this regard, when the two channels are dependent, for example, when a quantization parameter of another channel is determined to be smaller than a quantization parameter of one channel, the luma data is quantized according to different quantization parameters. During this process, a data loss may be different due to quantization between the split luma data.

Therefore, when a decoding apparatus decodes the quantized and encoded luma data, since quantization parameters are different according to channels, if two pieces of decoded luma data to which different quantization parameters are applied are merged into luma data having one component, a difference in the image quality between data occurs due to a difference in a quantization error, and thus a user may determine that the image quality is bad.

Referring to FIG. 7A, the encoding apparatus 60 may include a receiver 61, a data allocator 62, and an encoder 63.

The receiver 61 may receive image data. For example, the receiver 61 may receive image data having a plurality of components including chroma and luma components.

The data allocator 62 may allocate the image data having the plurality of components including the chroma and luma components to each of a plurality of channels.

The encoder 63 may encode the image data having the plurality of components allocated to each of the plurality of channels. In this regard, the encoder 63 may encode the image data by using an independent quantization parameter with respect to each of the plurality of channels.

In this regard, the encoding apparatus 60 may determine quantization parameters of other channels with respect to a quantization parameter of one channel and include information regarding an offset in a bitstream.

Figure 7B:
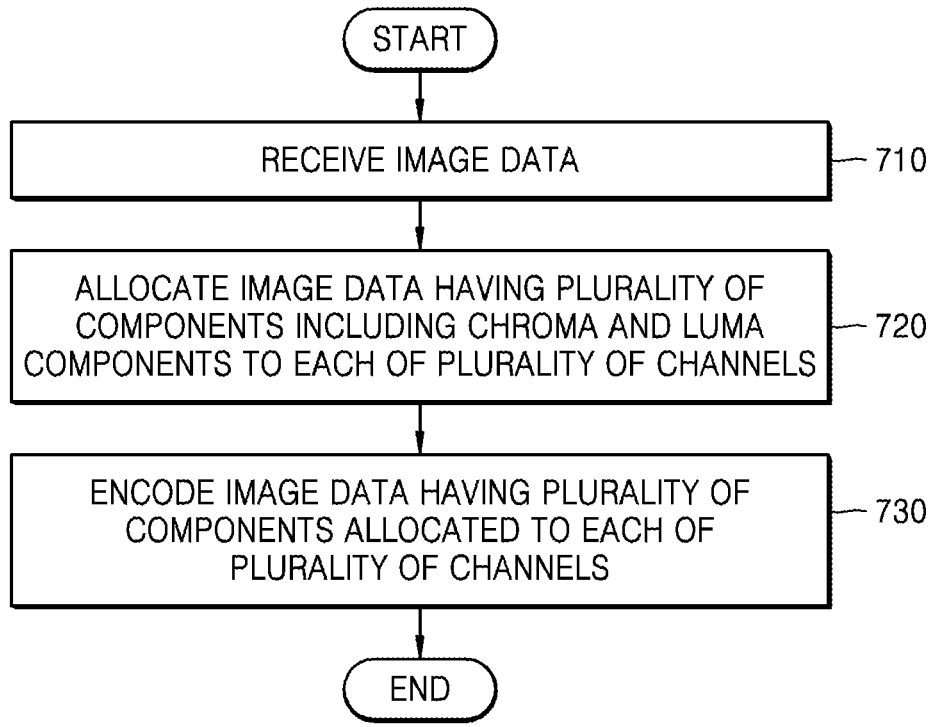
FIG. 7B is a flowchart of an encoding method according to an embodiment of the present disclosure.

FIG. 7B is a flowchart of an encoding method according to an embodiment of the present disclosure.

Referring to FIG. 7B, in operation 710, the encoding apparatus 60 may receive image data. The encoding apparatus 60 may receive image data having a plurality of components including chroma and luma components.

In operation 720, the encoding apparatus 60 may allocate the image data having the plurality of components including the chroma and luma components to each of a plurality of channels.

In operation 730, the encoding apparatus 60 may encode the image data having the plurality of components allocated to each of the plurality of channels. In this regard, the encoding apparatus 60 may encode the image data by using an independent quantization parameter with respect to each of the plurality of channels. In this regard, the encoding apparatus 60 may determine quantization parameters of other channels with respect to a quantization parameter of one channel and include information regarding an offset in a bitstream.

Figure 7C:
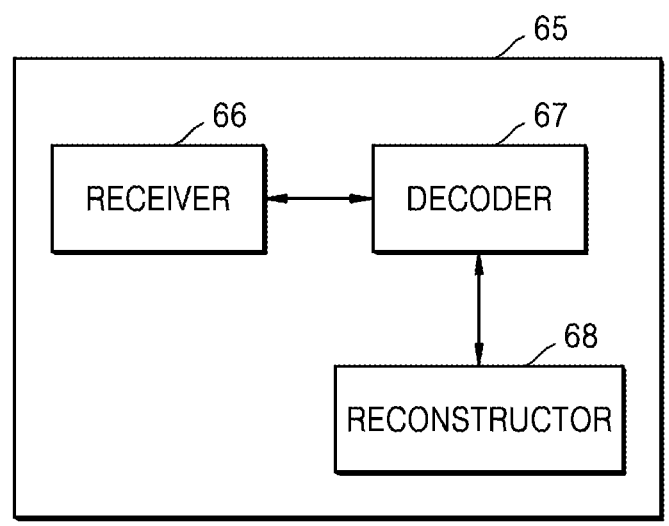
FIG. 7C is a block diagram of a decoding apparatus according to an embodiment of the present disclosure.

FIG. 7C is a block diagram of a decoding apparatus 65 according to an embodiment of the present disclosure.

Referring to FIG. 7C, the decoding apparatus 65 may include a receiver 66, a decoder 67, and a reconstructor 68.

The receiver 66 may receive a bitstream including encoded image information.

The decoder 67 may decode an image based on the encoded image information.

The decoder 67 may perform a function of the decoding apparatus 2. The decoder 67 may obtain luma data and chroma data that are allocated to a plurality of channels from data generated by decoding the image.

In operation 760, the decoding apparatus 65 may decode an image based on the encoded image information. In this regard, luma data and chroma data that are allocated to a plurality of channels may be generated by decoding the image. The decoding apparatus 65 may obtain the luma data and the chroma data that are allocated to the plurality of channels from data generated by decoding the image.

In this regard, the decoding apparatus 65 may decode the image by using an independent quantization parameter with respect to each of the plurality of channels In operation 770, the decoding apparatus 65 may reconstruct the image by using the luma data and the chroma data that are allocated to the plurality of channels.

Figure 8A:
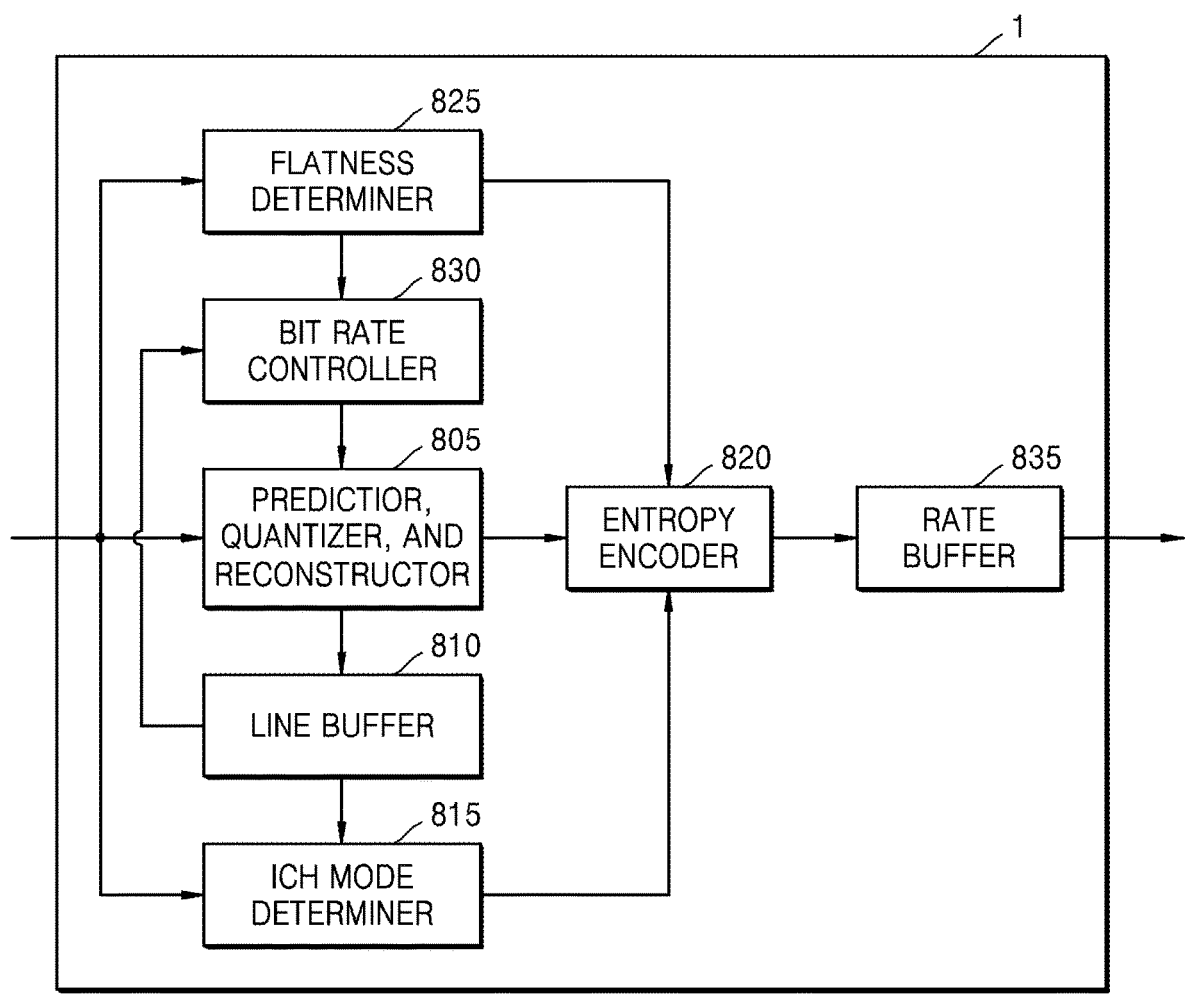
FIG. 8A is a block diagram of an encoding apparatus according to an embodiment of the present disclosure.

FIG. 8A is a block diagram of the encoding apparatus 1 according to an embodiment of the present disclosure.

Referring to FIG. 8A, the encoding apparatus 1 includes a predictor, quantizer, and reconstructor 805, a line buffer 810, an ICH mode determiner 815, an entropy encoder 820, a flatness determiner 825, a bit rate controller 830, and a rate buffer 835.

The predictor, quantizer, and reconstructor 805 predicts a current pixel included in an image. The predictor, quantizer, and reconstructor 805 generates a residue component representing the difference between a prediction value of the current pixel and a sample value of the current pixel, quantizes the residue component, and encodes the quantized residue component.

The predictor, quantizer, and reconstructor 805 may decode the encoded pixel, store the decoded pixel in the line buffer 810, and use the stored pixel to predict another pixel.

In detail, by using a modified median-adaptive predictor (MMAP), the predictor, quantizer, and reconstructor 805 may simultaneously predict three current pixels as shown in Table 1 below.

TABLE 1

```
filtB=(c+2*b+d+2)>>2;
diffC=CLAMP(filtC-c, QuantDivisor[qLevel]/2, QuantDivisor[qLevel]/2;
blendC=c+diffC;
diffB=CLAMP(filtB-b, QuantDivisor[qLevel]/2, QuantDivisor[qLevel]/2;
blendB=B+diffB;
diffD=CLAMP(filtD-d, QuantDivisor[qLevel]/2, QuantDivisor[qLevel]/2;
blendD=d+diffD;                                                              JPEG-LS MED
diffE=CLAMP(filtE-e, QuantDivisor[qLevel]/2, QuantDivisor[qLevel]/2;          P0=CLAMP(a+b-c, MIN(a, b), MAX(a, b));
blendE=e+diffE;
P0=CLAMP(a+blendB-blendC,        MIN(a, blendB),            MAX(a, blendB));
P1=CLAMP(a+blendD-blednC+R0,     MIN(a, blendB, blendD),    MAX(a, blendB, blendD));
P2=CLAMP(a+blendE-blendC+R0+R1 , MIN(a, blendB, blendD, blendE),  MAX(a, blendB, blendD, blendE));
inverse quantized residual of first pixel and second pixel
[First line]
P0=a;
P1=CLAMP(a+R0, 0, (1<<maxBpc)-1);
P2=CLAMP(a+R0, R1, 0, (1<<maxBpc)-1);
```

The decoder 67 may decode the image by using an independent quantization parameter with respect to each of the plurality of channels, unlike the decoding apparatus 2. In detail, the decoder 67 may determine quantization parameters of other channels in a quantization parameter of one channel by using information relating to an offset included in the bitstream.

Figure 7D:
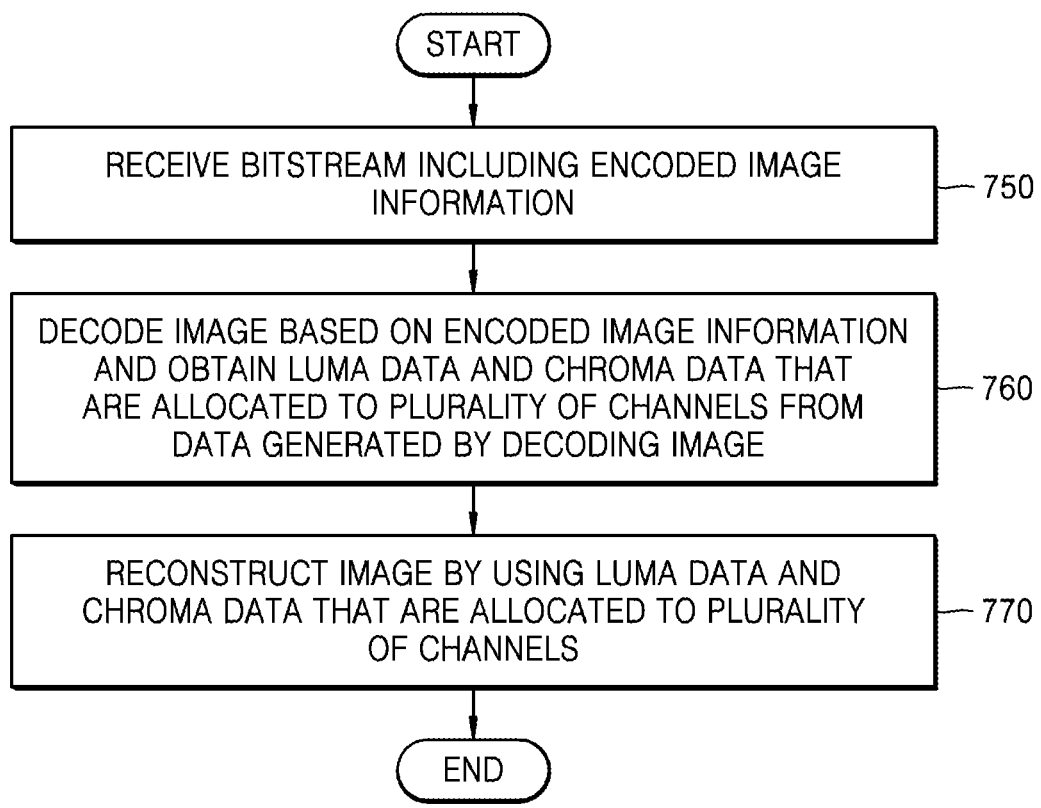
FIG. 7D is a flowchart of a decoding method according to an embodiment of the present disclosure.

FIG. 7D is a flowchart of a decoding method according to an embodiment of the present disclosure.

Referring to FIG. 7D, in operation 750, the decoding apparatus 65 may receive a bitstream including encoded image information.

Figure 8B:
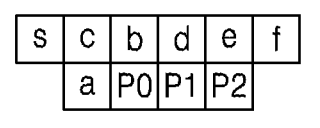

As illustrated in FIG. 8B, the predictor, quantizer, and reconstructor 805 may predict first, second, and third current pixels as P0, P1, and P2 respectively as shown in Table 1. That is, it may be possible to use a sample value of a pixel a which is previously decoded immediately before encoding the current pixels in the current line and sample values of pixels s, c, b, d, e, and f of the previous line stored in the line buffer 810.

In this regard, -QuantDivisor[qLevel]/2, QuantDivisor [qLevel]/2 denotes a minimum value or a maximum value that may be currently quantized. CLAMP(a,b,c) denotes a function that outputs a when a is between b and c, outputs b when a is smaller than b, and outputs c when a is greater than c. Maxbpc denotes the maximum number of bits per channel.

For example, the predictor, quantizer, and reconstructor 805 determines a filtering output filtB of the pixel b by using the pixel b, the left pixel c adjacent to the pixel b, and the pixel d adjacent to the pixel b. In similar ways, the predictor, quantizer, and reconstructor 805 may determine filtering outputs filtC, filtD, and filtE of the pixels c, d, and e.

The predictor, quantizer, and reconstructor 805 may determine diffC related to the pixel c by using filtC, the value of the pixel c, and the minimum value or the maximum value that may be currently quantized. For example, the predictor, quantizer, and reconstructor 805 may determine diffC as a difference value filtC-c between the value of the pixel c and filtC that is between the minimum value and the maximum value that may be currently quantized. In similar ways, the predictor, quantizer, and reconstructor 805 may determine diffB, diffD, and diffE.

The predictor, quantizer, and reconstructor 805 may determine blendC related to the pixel c by using the value of the pixel c and filtC related to the pixel c. In similar ways, the predictor, quantizer, and reconstructor 805 may determine blendB, blendD, and blendE.

The prediction value P0 of the current first pixel may be determined by using the value of pixel a, blendB, and blendC. In the case of JPEG-LS standards, the prediction value P0 of the current pixel P0 is determined by using the value of the pixel a, the value of the pixel b, and the value of the pixel c. However, the predictor, quantizer, and reconstructor 805 may perform efficient encoding by using blendB instead of the value of the pixel b and blendC instead of the value of pixel c.

The prediction value P1 of the current second pixel may be determined by using the value of the pixel a, blendB, blendC, blendD, and a residual R0 of the current first pixel.

The prediction value P2 of the third pixel may be determined by using the value of the pixel a, blendB, blendC, blendD, blendE, the residual R0 of the current first pixel, and a residual R1 of the current second pixel.

In the case of the first line, since there is no previous line, the prediction value P0 of the current first pixel may be determined by using the value of the pixel a, and the prediction value P1 of the current second pixel may be determined by using the value of the pixel a, the residual R0 of the current first pixel, and the maximum number Maxbpc of bits per channel. Likewise, the prediction value P2 of the current third pixel may be determined by using the value of the pixel a, the residual R0 of the current first pixel, the residual R1 of the current second pixel, and the maximum number Maxbpc of bits per channel.

In order to predict the current, first, second, and third pixels (P0, P1, and P2), a block prediction (BP) may be used to perform another prediction as shown in Table 2 below.

TABLE 2

P[hPos]=recon[hPos+vpVector]
vpVector:−3~−10

Figure 8C:
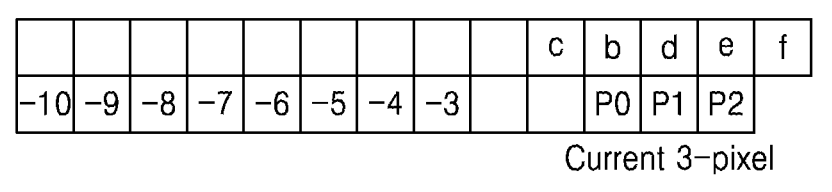

As illustrated in FIG. 8C, the predictor, quantizer, and reconstructor 805 may determine a vpVector value and predict a current pixel with reference to the value of a relevant pixel according to the determined vpVector value. Herein, hPos denotes an index representing the position of the current pixel. For example, when hPos is 0, it denotes the current first pixel, and P[hPos] of the current first pixel may be a value that is predicted by using the value of a pixel in which an index representing the position of a reference pixel is hPos+vpVector according to the vpVector value (−3~−10).

By using a midpoint prediction (MPP), the predictor, quantizer, and reconstructor 805 may predict current three pixels differently as shown in Table 3 below.

TABLE 3 midpointPred=(1<<(maxBpc−1))+(a&((1<<qLevel)−1));
where a is left poevious recon pixel,
(even if the previous group is on the previous line)

Figure 8D:
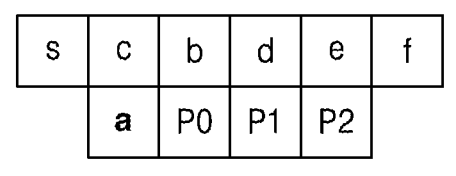

When the maximum value of residue components of the current three pixels is equal to or greater than the difference between the maximum number maxBpc of bits per channel and a quantization parameter qLevel, an MPP may be performed as illustrated in FIG. 8D. In this case, a prediction value midpointPred of current three bits may be determined by using the value of the pixel a, the maximum number of bits per channel, and the quantization parameter. In the case of an MPP-based prediction, the size of a residue component may be set according to the difference between the maximum number maxBpc of bits per channel and the quantization parameter qLevel.

The ICH mode determiner 815 may determine whether to use an ICH mode for the current three pixels. For example, the ICH mode determiner 815 may determine whether to use the MMAP or the ICH mode. The ICH mode will be described later in detail. The ICH mode may be suitable for patterns or graphics that are not well predicted by the MMAP but may refer to adjacent pixel values.

The line buffer 810 may store sample values of pixels located at a line previous to a line at which the current three pixels are located.

The entropy encoder 420 may entropy-encode residue components of the current three pixels and other encoding information. In detail, the entropy encoder 420 may variable length entropy-encode the residue components of the current three pixels and other encoding information.

In order to reduce a quantization distortion, the flatness determiner 825 determines whether there is a change from a region including a non-flat pixel to a region including a flat pixel. Based on the determination of the flatness determiner 825, the bit rate controller 830 may adjust the quantization parameter.

The bit rate controller 830 may control a bit rate on the basis of the state of the rate buffer 835, the number of bits used in current prediction, and the adjustment of the quantization parameter determined by the flatness determiner 825.

The rate buffer 835 temporarily stores a bitstream so that the bitstream may be transmitted without loss.

Figure 8E:
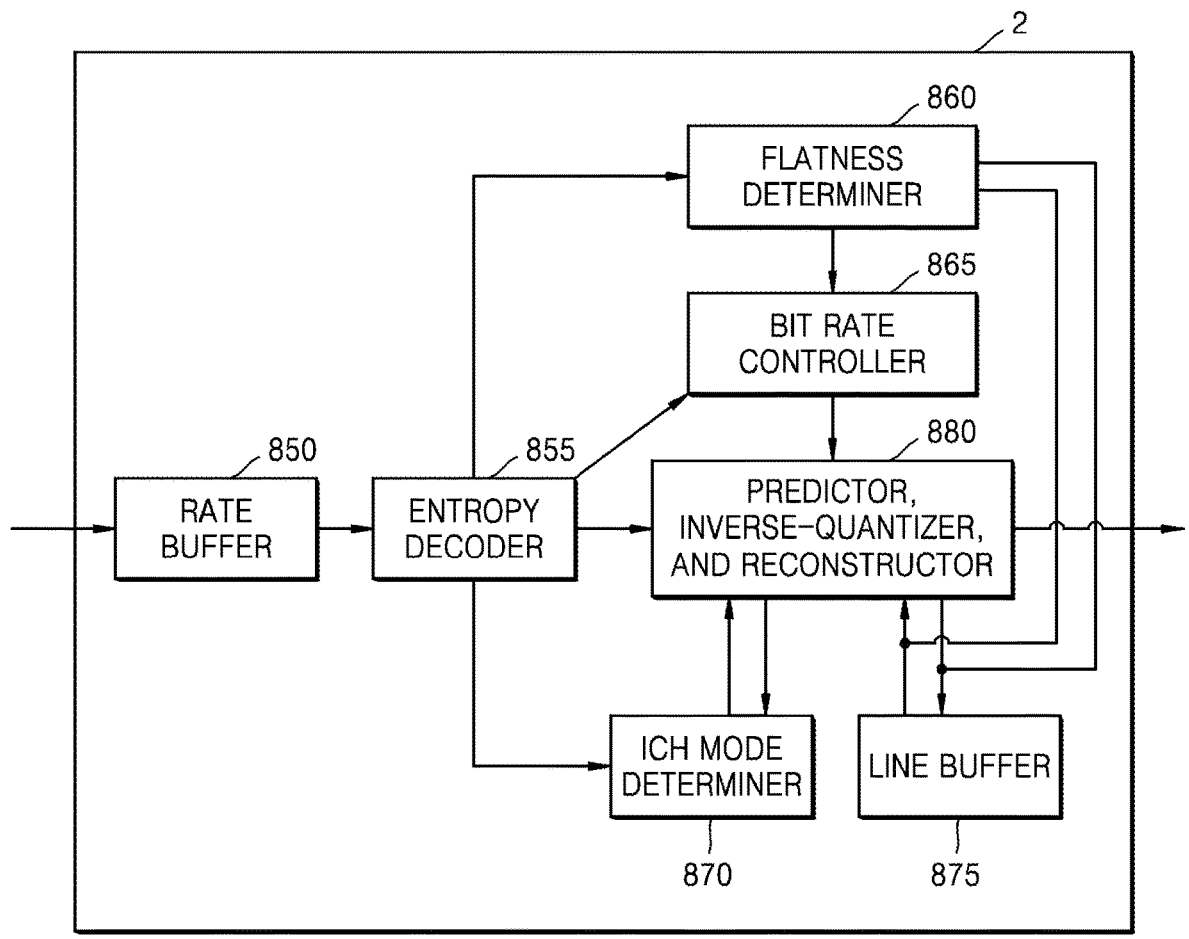
FIG. 8E is a block diagram of a decoding apparatus according to an embodiment of the present disclosure.

FIG. 8E is a block diagram of the decoding apparatus 2 according to an embodiment of the present disclosure.

Referring to FIG. 8E, the decoding apparatus 2 includes a rate buffer 850, an entropy decoder 855, a flatness determiner 860, a bit rate controller 865, an ICH mode determiner 870, a line buffer 875, and a predictor, inverse-quantizer, and reconstructor 880.

The rate buffer 850 temporarily stores a bitstream so that the bitstream may be received without loss.

The entropy decoder 855 entropy-decodes a received bitstream.

In order to reduce a quantization distortion, on the basis of encoding information included in the received bitstream, the flatness determiner 860 determines whether there is a change from a region including a non-flat pixel to a region including a flat pixel.

Based on the determination of the flatness determiner 860, the bit rate controller 865 may adjust the quantization parameter.

The bit rate controller 865 may control a bit rate on the basis of the number of bits used in current prediction and the adjustment of the quantization parameter determined by the flatness determiner 860.

On the basis of the encoding information received from the bitstream, the ICH mode determiner 870 may determine whether to use an ICH mode for the current three pixels. For example, the ICH mode determiner 870 may determine whether to use the MMAP or the ICH mode. The ICH mode will be described later in detail. The ICH mode may be suitable for patterns or graphics that are not well predicted by the MMAP but may refer to adjacent pixel values.

The line buffer 875 may store sample values of pixels located at a line previous to a line at which the current three pixels are located.

The predictor, inverse-quantizer, and reconstructor 880 may predict a current pixel on the basis of the encoding information included in the received bitstream, inverse-binarize a residue component included in the bitstream, reconstruct current three pixels by synthesizing the inverse-binarization result with a prediction value of the current pixel, store a decoded pixel in the line buffer 875, and use the stored pixel to predict a next pixel.

In detail, by using an MMAP, the predictor, inverse-quantizer, and reconstructor 880 may predict three pixels as shown in Table 4 below.

b. In similar ways, the predictor, quantizer, and reconstructor 805 may determine filtering outputs filtC, filtD, and filtE of the pixels c, d, and e.

The predictor, quantizer, and reconstructor 805 may determine diffC related to the pixel c by using filtC, the value of the pixel c, and the minimum value or the maximum value that may be currently quantized. For example, the predictor, quantizer, and reconstructor 805 may determine diffC as a difference value filtC-c between the value of the pixel c and filtC that is between the minimum value and the maximum value that may be currently quantized. In similar ways, the predictor, quantizer, and reconstructor 805 may determine diffB, diffD, and diffE.

The predictor, quantizer, and reconstructor 805 may determine blendC related to the pixel c by using the value of the pixel c and filtC related to the pixel c. In similar ways, the predictor, quantizer, and reconstructor 805 may determine blendB, blendD, and blendE.

The prediction value P0 of the current first pixel may be determined by using the value of pixel a, blendB, and blendC. In the case of JPEG-LS standards, the prediction value P0 of the current pixel P0 is determined by using the value of the pixel a, the value of the pixel b, and the value of the pixel c. However, the predictor, quantizer, and reconstructor 805 uses blendB instead of the value of the pixel b and blendC instead of the value of pixel c.

The prediction value P1 of the current second pixel may be determined by using the value of the pixel a, blendB, blendC, blendD, and a residual R0 of the current first pixel.

The prediction value P2 of the third pixel may be determined by using the value of the pixel a, blendB, blendC,

TABLE 4 filtB=(c+2*b+d+2)>>2;
diffC=CLAMP(filtC-c, QuantDivisor[qLevel]/2, QuantDivisor[qLevel]/2;
blendC=c+diffC;
diffB=CLAMP(filtB-b, QuantDivisor[qLevel]/2, QuantDivisor[qLevel]/2;
blendB=B+diffB;
diffD=CLAMP(filtD-d, QuantDivisor[qLevel]/2, QuantDivisor[qLevel]/2;
blendD=d+diffD;
diffE=CLAMP(filtE-e, QuantDivisor[qLevel]/2, QuantDivisor[qLevel]/2;    JPEG-LS MED
blendE=e+diffE;                                                          P0=CLAMP(a+b-c, MIN(a, b), MAX(a, b));
P0=CLAMP(a+blendB-blendC,        MIN(a, blendB),                MAX(a, blendB));
P1=CLAMP(a+blendD-blednC+R0,     MIN(a, blendB, blendD),        MAX(a, blendB, blendD));
P2=CLAMP(a+blendE-blendC+R0+R1 , MIN(a, blendB, blendD, blendE), MAX(a, blendB, blendD, blendE));
inverse quantized residual of first pixel and second pixel
[First line]
P0=a;
P1=CLAMP(a+R0, 0, (1<<maxBpc)-1);
P2=CLAMP(a+R0, R1, 0, (1<<maxBpc)-1);

As illustrated in FIG. 8B, first, second, and third current pixels may be predicted as P0, P1, and P2 respectively. That is, it may be possible to use a sample value of pixel a which is previously decoded immediately before the current line and pixels s, c, b, d, e, and f of the previous line stored in the line buffer 875. In this regard, -QuantDivisor[qLevel]/2, QuantDivisor[qLevel]/2 denotes a minimum value or a maximum value that may be currently quantized.

CLAMP(a,b,c) denotes a function that outputs a when a is between b and c, outputs b when a is smaller than b, and outputs c when a is greater than c. Maxbpc denotes the number of bits per channel. For example, the predictor, quantizer, and reconstructor 805 determines a filtering output filtB of the pixel b by using the pixel b, the left pixel c adjacent to the pixel b, and the pixel d adjacent to the pixel blendD, blendE, the residual R0 of the current first pixel, and a residual R1 of the current second pixel.

In the case where the current pixel is located in the first line, since there is no previous line, the prediction value P0 of the current first pixel may be determined by using the value of the pixel a, and the prediction value P1 of the current second pixel may be determined by using the value of the pixel a, the residual R0 of the current first pixel, and the maximum number Maxbpc of bits per channel. Likewise, the prediction value P2 of the current third pixel may be determined by using the value of the pixel a, the residual R0 of the current first pixel, the residual R1 of the current second pixel, and the maximum number Maxbpc of bits per channel.

In order to predict the current, first, second, and third pixels, a BP may be used to perform another prediction as shown in Table 5 below.

TABLE 5

P[hPos]=recon[hPos+vpVector]
vpVector:−3~−10

As illustrated in FIG. 8C, the predictor, inverse-quantizer, and reconstructor 880 may determine a vpVector value and predict a current pixel with reference to the value of a relevant pixel according to the determined vpVector value. Herein, hPos denotes an index representing the position of the current pixel. For example, when hPos is 0, it denotes the current first pixel, and P[hPos] of the current first pixel may be a value that is predicted by using the value of a pixel in which an index representing the position of a reference pixel is hPos+vpVector according to the vpVector value (−3~−10).

By using an MPP, the predictor, inverse-quantizer, and reconstructor 880 may predict current three pixels as shown in Table 6 below.

TABLE 6 midpointPred=(1<<(maxBpc−1))+(a&((1<<qLevel)−1));
where a is left poevious recon pixel,
(even if the previous group is on the previous line)

When the maximum value of residue components of the current three pixels is equal to or greater than the difference between the maximum number maxBpc of bits per channel and a quantization parameter qLevel, an MPP may be performed as illustrated in FIG. 8D. In this case, a prediction value midpointPred of current three bits may be determined by using the value of the pixel a, the maximum number of bits per channel, and the quantization parameter. In the case of an MPP-based prediction, the size of a residue component may be set according to the difference between the maximum number maxBpc of bits per channel and the quantization parameter qLevel.

Figure 9A:
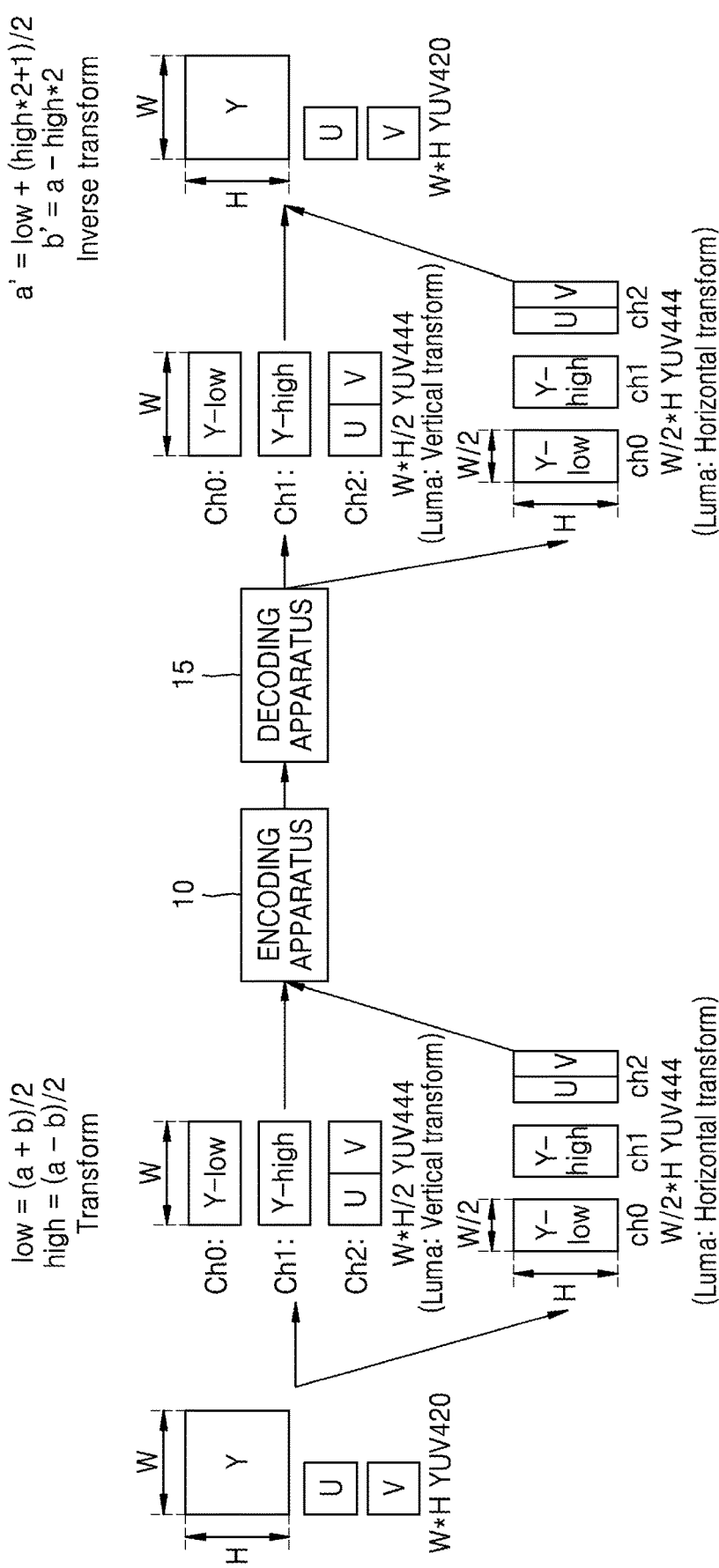
FIG. 9A is a diagram for describing a process of encoding/decoding YUV 4:2:0 format data without up-sampling according to an embodiment of the present disclosure.

FIG. 9A is a diagram for describing a process of encoding/decoding YUV 4:2:0 format data without up-sampling according to an embodiment of the present disclosure.

Referring to FIG. 9A, it is assumed that YUV 4:2:0 format image data having an image height H and an image width W is input data. In general, the encoding apparatus 10 may receive an input of three channels and encode an image. In this regard, the input of three channels may be an input of Y, U, and V components.

In the case of the YUV 4:2:0 format image data, an amount of data of the U and V components is ¼ an amount of data of the Y component.

When the Y, U, and V components included in the YUV 4:2:0 format image data are respectively input to the three channels of the encoding apparatus 10 (in particular, the encoder 13), an amount of data input to each channel is different.

The encoding apparatus 10 converts the YUV 4:2:0 format image data into YUV 4:4:4 format image data and encodes the converted YUV 4:4:4 format image data.

Therefore, chroma data included in image data may be up-sampled during a process of converting the YUV 4:2:0 format image data into the YUV 4:4:4 format image data. In this regard, since the up-sampled chroma data is not data related to an actual image, an amount of data unnecessarily increases.

Therefore, the encoding apparatus 10 allocates the same amount of data to each channel by taking into account an amount of luma data having one component and an amount of chroma data having two components such that the encoding apparatus 10 may recognize the YUV 4:4:4 format image data by inputting the same amount of data to each of the Y, U, and V channels, and thus a method of preventing unnecessary up-sampling is provided.

According to an embodiment, the encoding apparatus 10 may allocate image data to each channel. Luma data having a Y component is split into two pieces of luma data in a frequency region so that an amount of data allocated to a channel is reduced to ½. In this regard, frequency conversion is performed on the luma data so that luma data of a high frequency region and luma data of a low frequency region may be generated, and thus the luma data may be split into the luma data of the high frequency region and the low frequency region. In this regard, a frequency conversion method may determine the luma data of the high frequency region and the low frequency region by using a sample value a of a pixel and a sample value b of an adjacent pixel. The adjacent pixel whose value is b may be located in a next lower line adjacent to a line which includes the pixel whose value is a. A sample of data in the high frequency region may be computed as (a−b) or (a−b)>>1 (that is, (a−b)/2). A sample of data in the low frequency region may be computed as (a+b)>>1 (that is, (a+b)/2).

For example, the split two pieces of luma data may be allocated to channels Ch0 and Ch1. In this regard, since the amount of data allocated to the channel halves, a height halves (vertical transform) or a width halves (horizontal transform), and thus the data may be transmitted through the channels Ch0 and Ch1. For example, a process of performing vertical transform will be described in detail with reference to FIG. 9C below.

In general, the channel Ch0 is for luma data and the channels Ch1 and Ch2 are for chroma data in the encoder 13. Since human eyes are less sensitive to chroma than luma, luma data is encoded by using a low quantization parameter with respect to luma data that is input to the channel Ch0. Chroma data is encoded by using a high quantization parameter with respect to chroma data that is input to the channels Ch1 and Ch2.

The encoding apparatus 10 may split luma data into two pieces of luma data, allocate data of a low frequency region to the channel Ch0, and allocate data of a high frequency region to the channel Ch1. Since human eyes have a characteristic of a low frequency pass filter, the human eyes are more sensitive to a low frequency and less sensitive to a high frequency, and thus the relatively more sensitive data of the low frequency region is allocated to the channel Ch0 using the low quantization parameter, and the relatively less sensitive data of the high frequency region is allocated to the channel Ch1 using the high quantization parameter, thereby efficiently encoding the luma data.

The encoding apparatus 10 may allocate chroma data having two components to the channel Ch2. In this regard, the chroma data having two components in the YUV 4:2:0 format image data is ¼ the luma data, and the luma data halves and is allocated to two channels. In this regard, if the chroma data having two components are allocated to one channel, the same amount of data is transmitted through each channel.

Therefore, the encoding apparatus 10 may recognize the allocated luma data and the allocated chroma data like the YUV 4:4:4 format image data in which the encoding apparatus 10 inputs the same amount of data to the Y, U, and V channels.

In conclusion, the encoding apparatus 10 encodes an image without a separate up-sampling process, and thus unnecessary data may not be generated.

The encoding apparatus 10 encodes the luma data and the chroma data that are input through the channels Ch0, Ch1, and Ch2. As described above, the encoding apparatus 10 may encode the luma data and the chroma data by using different quantization parameters with respect to each channel. The encoding apparatus 10 may generate a bitstream including encoded information.

The decoding apparatus 15 may receive a bitstream including encoded image information and decode an image by using the received encoded image information. In this regard, data of the decoded image may be obtained from each channel. Data obtained in the decoding apparatus 15 may include luma data of a low frequency region allocated to the channel Ch0, luma data of a high frequency region allocated to the channel Ch1, and chroma data having two components allocated to the channel Ch2. The decoding apparatus 15 may merge the include the luma data of the low frequency region allocated to the channel Ch0 and the luma data of the high frequency region allocated to the channel Ch1 to generate luma data having one component.

In this regard, the merged data may be merely a combination of the luma data of the low frequency region and the luma data of the high frequency region. Thus, the decoding apparatus 15 may perform frequency inverse conversion on the merged data and convert the merged data into luma data of a spatial domain. When the decoding apparatus 15 performs frequency inverse conversion, the decoding apparatus 15 may determine sample values a and b of a pixel by using a low frequency component low and a high frequency component high.

In this regard, reconstructed luma data has an image width W and an image height H. The decoding apparatus 15 may obtain chroma data having the U and V components in the channel Ch2 by decoding the image. The decoding apparatus 15 may split the obtained chroma data into chroma data of the U and V components.

The decoding apparatus 15 may reconstruct an image by using image data including the luma data of the Y component obtained through the channels Ch0 and Ch1 and the chroma data of the U and V components obtained through the channel Ch2. In this regard, the image data of each of the Y, U, and V components used to reconstruct the image is the YUV 4:2:0 format image data.

FIG. 9B is a diagram for describing a process of encoding/decoding YUV 4:2:0 format data without up-sampling according to an embodiment of the present disclosure.

Referring to FIG. 9B, it is assumed that YUV 4:2:0 format image data having an image height H and an image width W is input data. In general, the encoding apparatus 10 may receive an input of three channels and encode an image. In this regard, the input of three channels may be an input of Y, U, and V components. In the case of the YUV 4:2:0 format image data, an amount of data of the U and V components is ¼ an amount of data of the Y component.

When the Y, U, and V components included in the YUV 4:2:0 format image data are respectively input to the three channels of the encoding apparatus 10, an amount of data input to each channel is different.

In general, the encoding apparatus 10 processes the YUV 4:2:0 format image data after converting the YUV 4:2:0 format image data into YUV 4:4:4 format image data. Therefore, chroma data included in image data may be up-sampled during a process of converting the YUV 4:2:0 format image data into the YUV 4:4:4 format image data. In this regard, the up-sampled chroma data is not data indicating information regarding an actual image. Thus, an amount of data unnecessarily increases.

The encoding apparatus 10 allocates the same amount of data to each channel by taking into account an amount of luma data having one component and an amount of chroma data having two components such that the encoding apparatus 10 may recognize the allocated luma data and the allocated chroma data like the YUV 4:4:4 format image data in which the encoding apparatus 10 inputs the same amount of data to the Y, U, and V channels, and thus a method of preventing up-sampling that increases an amount of unnecessary data is provided.

According to an embodiment, the encoding apparatus 10 may allocate image data to each channel. Luma data having a Y component is split into two pieces of luma data in a frequency region so that an amount of data allocated to a channel is reduced to ½. For example, luma data is split in a spatial domain according to even/odd lines so that the luma data may be split into two pieces of luma data. Alternatively, luma data is split in the spatial domain according to even/odd columns so that the luma data may be split into two pieces of luma data.

The split two pieces of luma data may be allocated to the channels Ch0 and Ch1. In this regard, since the amount of data allocated to the channel halves, when the luma data is split in the spatial domain according to even/odd lines, a height may halve, when the luma data is split in the spatial domain according to even/odd columns, a width may halve, and thus the data may be transmitted through the channels Ch0 and Ch1.

For example, when the encoding apparatus 10 splits the luma data in the spatial domain according to even/odd lines, the encoding apparatus 10 may split the luma data into two pieces of luma data, allocate data of an even line region to the channel Ch0, and allocate data of an odd line region to the channel Ch1.

The encoding apparatus 10 may allocate chroma data having two components to the channel Ch2. In this regard, the chroma data having two components in the YUV 4:2:0 format image data is ¼ the luma data, and the luma data halves and is allocated to two channels. In this regard, if the chroma data having two components are allocated to one channel, the same amount of data is transmitted through each channel.

Therefore, the encoding apparatus 10 may recognize the allocated luma data and the allocated chroma data like the YUV 4:4:4 format image data in which the encoding apparatus 10 inputs the same amount of data to the Y, U, and V channels.

Thus, the encoding apparatus 10 encodes an image without a separate up-sampling process, and thus unnecessary data may not be generated.

The encoding apparatus 10 encodes the luma data and the chroma data that are input through the channels Ch0, Ch1, and Ch2. As described above, the encoding apparatus 10 may encode the luma data and the chroma data by using different quantization parameters with respect to each channel. The encoding apparatus 10 may generate a bitstream including encoded information.

The decoding apparatus 15 may receive a bitstream including encoded image information and decode an image by using the received encoded image information. In this regard, data of the decoded image may be obtained from each channel. Data obtained in the decoding apparatus 15 may include luma data of an even line region allocated to the channel Ch0, luma data of an odd line region allocated to the channel Ch1, and chroma data having two components allocated to the channel Ch2. The decoding apparatus 15 may merge the include the luma data of the even line region allocated to the channel Ch0 and the luma data of the odd line region allocated to the channel Ch1 to generate luma data having one component.

In this regard, reconstructed luma data has an image width W and an image height H. The decoding apparatus 15 may obtain chroma data having the U and V components in the channel Ch2 by decoding the image. The decoding apparatus 15 may split the obtained chroma data into chroma data of the U and V components.

The decoding apparatus 15 may reconstruct an image by using image data including the luma data of the Y component obtained through the channels Ch0 and Ch1 and the chroma data of the U and V components obtained through the channel Ch2. In this regard, the image data of each of the Y, U, and V components used to reconstruct the image is the YUV 4:2:0 format image data.

Figure 9C:
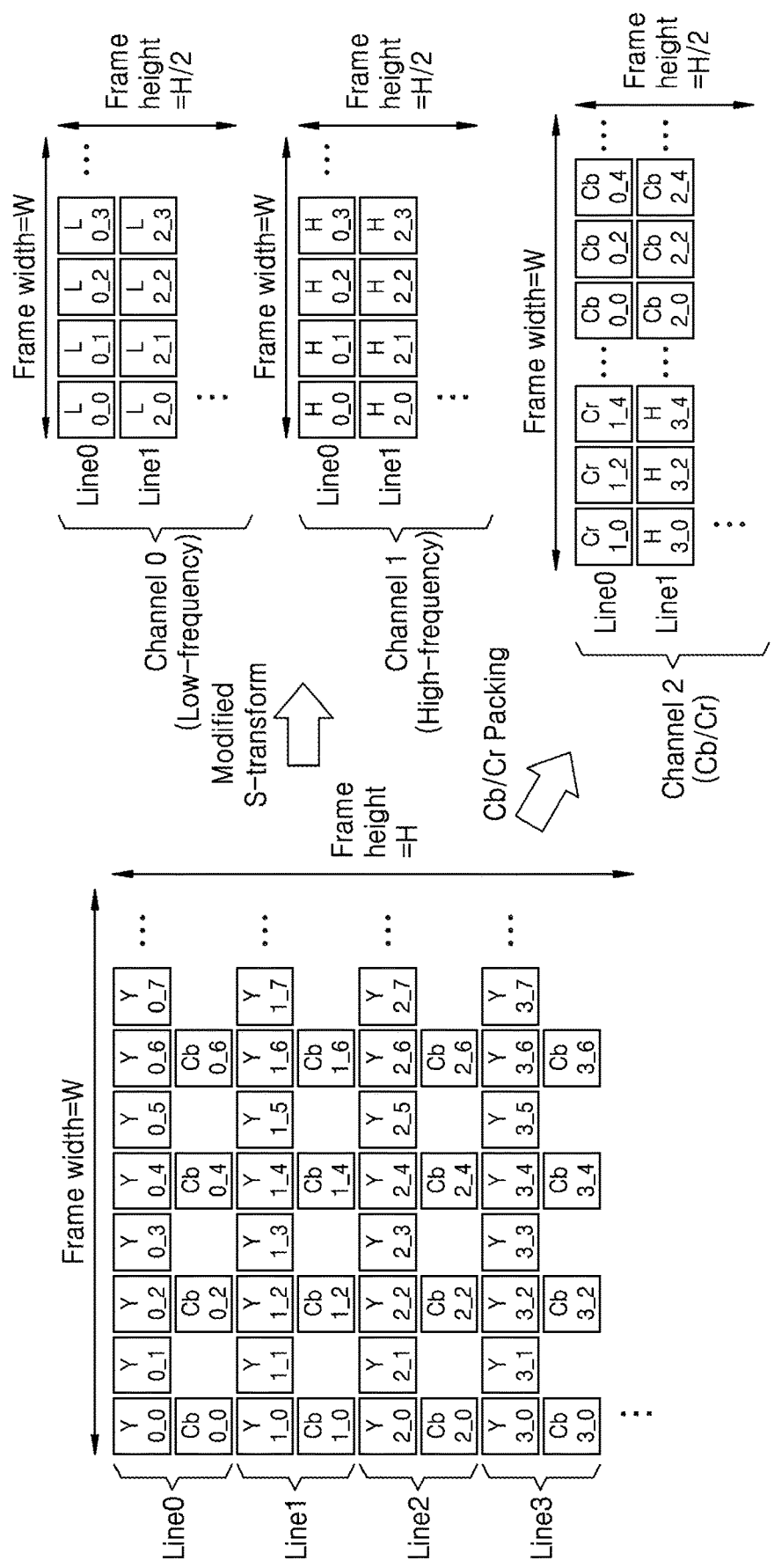
FIG. 9C is a diagram for describing a process of performing vertical transform in an encoding apparatus according to an embodiment of the present disclosure.

FIG. 9C is a diagram for describing a process of performing a vertical transform in an encoding apparatus according to an embodiment of the present disclosure.

Referring to FIG. 9C, s left figure shows YUV 4:2:0 format image data.

When the encoding apparatus perform vertical transform by using a frequency conversion method, the encoding apparatus may determine a luma sample value of a high frequency region and a sample value of a low frequency region by using a luma sample value of a current pixel and a luma sample value of a pixel of the same column and a different row adjacent to the current pixel. For example, the encoding apparatus may determine a luma sample value H0_0 of a high frequency region and a sample value L0_0 of a low frequency region by using a luma sample value Y0_0 of a current pixel located at a $0^{th}$ row and a $0^{th}$ column and a luma sample value Y_1_0 of a pixel located at a $1^{st}$ row and a $0^{th}$ column. The encoding apparatus may determine a luma sample value H2_0 of a high frequency region and a sample value L2_0 of a low frequency region by using a luma sample value Y2_0 of a current pixel located at a $2^{nd}$ row and a $0^{th}$ column and a luma sample value Y_3_0 of a pixel located at a $3^{rd}$ row and a $0^{th}$ column. Vertical transform may not be performed each row but may be performed by skipping each one row by every even row or every odd row).

Therefore, luma data including sample values of the high frequency region generated by performing vertical transform has an image width W and an image height H/2. This applies to luma data including sample values of the low frequency region.

In the case of horizontal transform, unlike vertical transform, a luma sample value of a high frequency region and a sample value of a low frequency region are determined by using a luma sample value of a current pixel and a luma sample value of a pixel of the same row and a different column adjacent to the current pixel, and a process of performing horizontal transform is similar, and thus a detailed description thereof is omitted.

Figure 10:
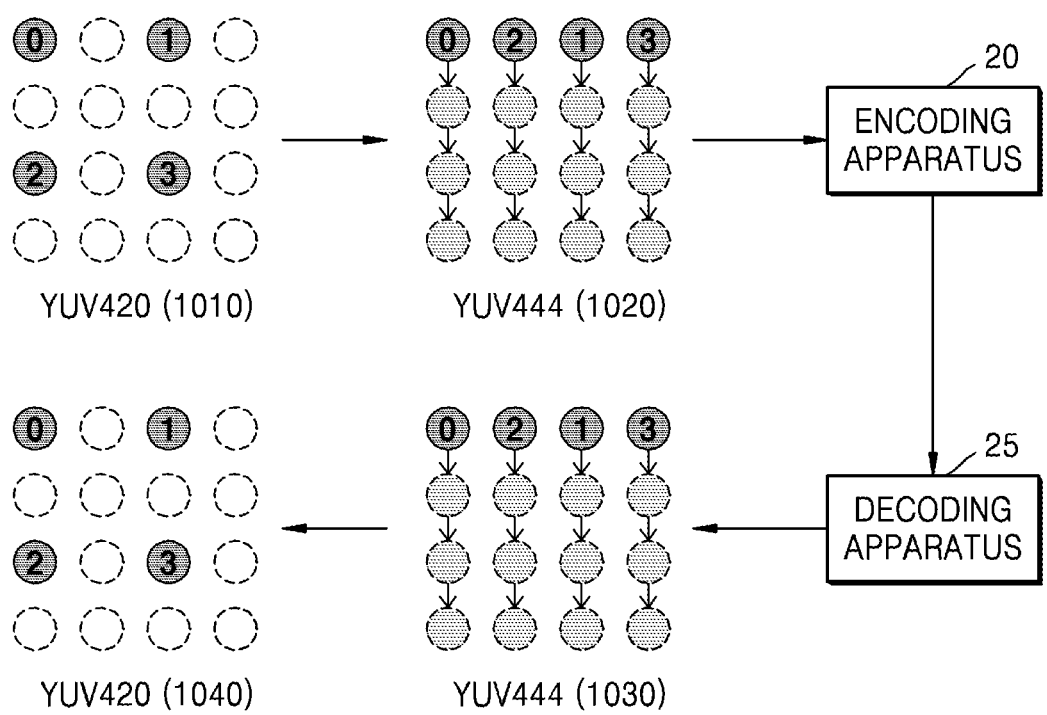
FIG. 10 is a diagram for describing a process of performing up-sampling in an encoding apparatus according to an embodiment of the present disclosure.

FIG. 10 is a diagram for describing a process of performing up-sampling in an encoding apparatus 20 according to an embodiment of the present disclosure.

The encoding apparatus 20 receives YUV 4:2:0 format image data and up-samples the YUV 4:2:0 format image data as YUV 4:4:4 format image data.

Chroma data 1010 included in the YUV 4:2:0 format image data is shown in FIG. 10. During a process of up-sampling the YUV 4:2:0 format image data 1010 as the YUV 4:4:4 format image data, the encoding apparatus 20 moves a chroma pixel (2, 3) included in the YUV 4:2:0 format image data to an empty chroma pixel located at one line to fill the one line, and fills other lines by using a pixel (0, 2, 1, 3) of the filled one line. Other lines are an empty region that needs to be filled in order to convert the YUV 4:2:0 format image data into the YUV 4:4:4 format image data.

The encoding apparatus 20 may fill one line and obtain a sample value of a pixel located the one line and then fill other lines by copying the sample value to down lines. The encoding apparatus 20 may fill one line, calculate an average of sample values of a plurality of pixels located at the one line, and fill down lines. However, the present disclosure is not limited thereto. The encoding apparatus 20 may determine a value that is to be filled in a down line from a sample value of an adjacent reconstructed pixel and fill down lines.

The encoding apparatus 20 may encode image data by using YUV 4:4:4 format image data 1020 as an input.

The encoding apparatus 20 may generate a bitstream including encoded the encoded image data.

The decoding apparatus 25 may receive the bitstream including the encoded image information and decode an image from the encoded information. The decoding apparatus 25 may decode the image to obtain image data including luma data and chroma data. The obtained image data may be YUV 4:4:4 format image data 1030.

The decoding apparatus 25 converts the YUV 4:4:4 format image data 1030 into YUV 4:2:0 format image data 1040. In this regard, the decoding apparatus 25 inversely performs a process performed by the encoding apparatus 20. That is, the decoding apparatus 25 may obtain the YUV 4:2:0 format image data 1040 through a process of locating a chroma pixel located at one line to another line so that the chroma pixel may be located at a chroma pixel of the YUV 4:2:0 format image data 1040 and dropping a sample value of an up-sampled region.

In this regard, the encoding apparatus 20 and the decoding apparatus 25 may concentrate data having image related information on one line in order to minimize transmission of up-sampled chroma data, thereby increasing compression efficiency and may fill a value in order to minimize residue information generated by predicting other lines, thereby increasing compression efficiency.

Figure 11:
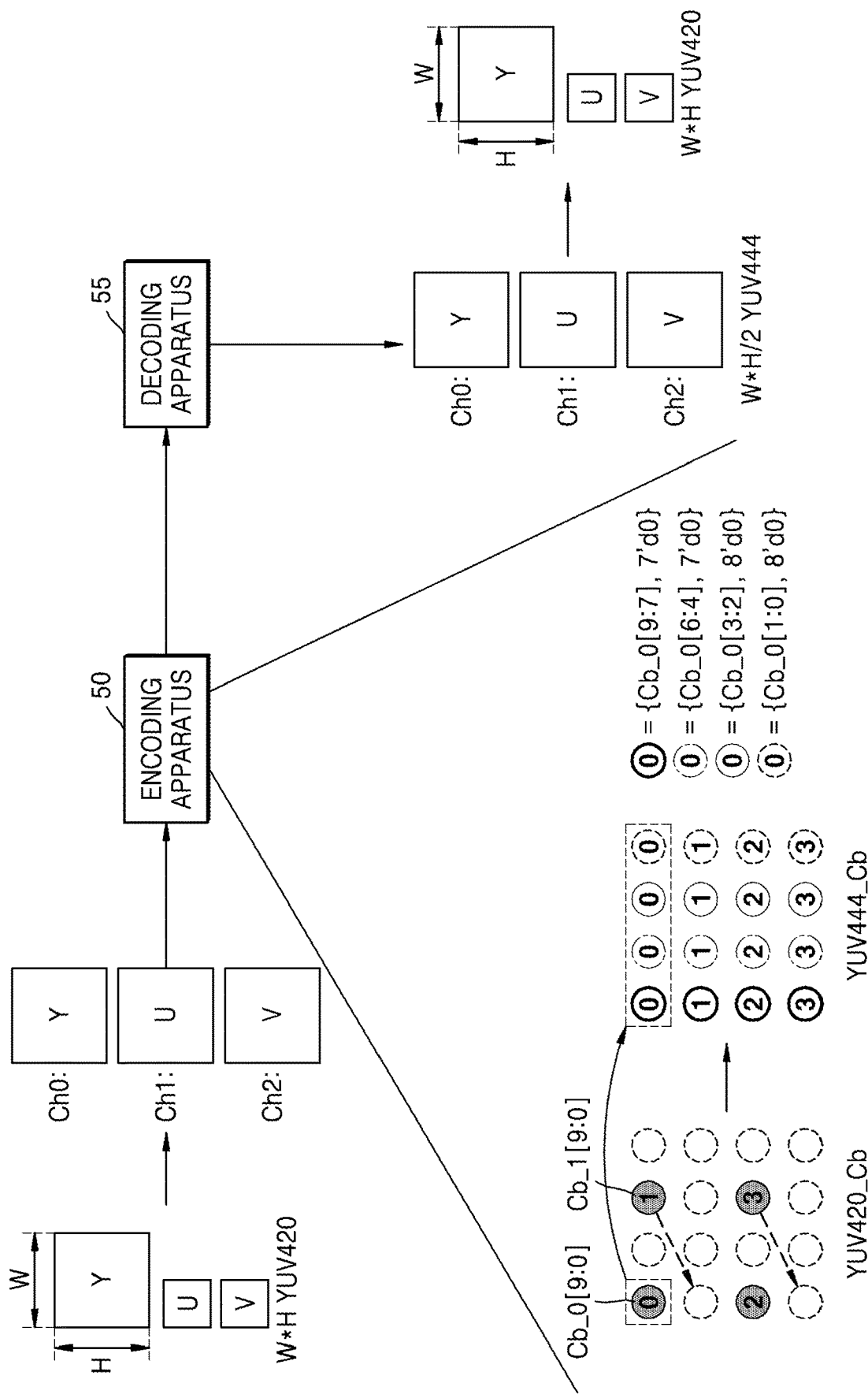
FIG. 11 is a diagram for describing a process of splitting and encoding/decoding chroma data in encoding/decoding apparatuses according to an embodiment of the present disclosure.

FIG. 11 is a diagram for describing a process of splitting and encoding/decoding chroma data in encoding/decoding apparatuses 50/55 according to an embodiment of the present disclosure.

The encoding apparatus 50 may split and encode/decode chroma Cb data included in YUV 4:2:0 format image data.

Referring to FIG. 11, the encoding apparatus 50 disperses some of 10 bits that is data expressing a pixel Cb_0 in an up-sampling region. For example, the encoding apparatus 50 disperses 10 bits in one line by remaining $7^{th}$-$9^{th}$ bits Cb_0[9:7] with respect to a least significant bit (LSB) among 10 bits of the pixel Cb_0 in their locations, allocating $4^{th}$-$6^{th}$ bits Cb_0[6:4] with respect to the LSB among 10 bits of the pixel Cb_0 to a right pixel part of the pixel Cb_0, and allocating $2^{nd}$ and $3^{rd}$ bits Cb_0[3:2] with respect to the LSB among 10 bits of the pixel Cb_0 to a location of a current pixel Cb_1, and allocating $0^{th}$ and $1^{st}$ bits Cb_0[1:0] with respect to the LSB among 10 bits of the pixel Cb_0 to a location next to the pixel Cb_1.

Although a sample value of each pixel is expressed as 10 bits, since all of 10 bits are filled by distribution, the sample value of each pixel is not expressed.

In this regard, data to be distributed may be filled with a most significant bit (MSB) of a pixel, and other bits may be filled with 0 by zero padding. The pixel Cb_1 is at a line below the pixel Cb_0 and thus data of the pixel Cb_1 may be distributed in the same manner as the pixel Cb_0. As described above, data is distributed, which may minimize data loss when chroma data is encoded by using a high quantization parameter.

That is, data lost during a quantization process is a lower LSB and may be minimized by distributing quantized data located in the lower LSB to an MSB of an up-sampling region.

In detail, the encoding apparatus 50 performs bit shift calculation to the right according to a value of a quantization parameter during the quantization process and the decoding apparatus 55 performs bit shift calculation to the left during an inverse quantization process.

For example, when a chroma pixel is expressed as 8 bits, if a pixel value is 15, the chroma pixel is expressed as bits 0000 1111. In this regard, two bits may be distributed in an MSB of each of 4 pixel bits. For example, if two bits are distributed in the MSB of each of 4 pixel bits and a lower bit is filled with 0, the 4 pixel bits are (0000 0000), (0000 0000), (1100 0000), and (1100 0000). In this regard, when a quantization parameter is 5, each pixel may remove lower 5 bits through right bit shift calculation. In this regard, the 4 pixel bits are (000), (000), (110), and (110). If data is inversely quantized, bit shift calculation to the left by 5 bits is performed and thus the 4 pixel bits are (0000 0000), (0000 0000), (1100 0000), and (1100 0000). In this regard, if 2 bits of an MSB of each pixel are merged, the inversely quantized data may be reconstructed to 15(0000 1111). When data is not distributed, if a quantization parameter is 5, 15 becomes 0. If data is inversely quantized, the inversely quantized data becomes 0, and thus data loss occurs. Therefore, data is distributed by using the up-sampling region, and thus deterioration of image quality may be minimized.

The encoding apparatus 50 may receive YUV 4:2:0 format image data and encode the received image data. In this regard, the encoding apparatus 50 may generate and transmit a bitsream including the encoded image data.

The decoding apparatus 55 may receive the bitsream including the encoded image information and decode an image by using the encoded image information.

The decoding apparatus 55 may decode the image to generate image data including chroma data and luma data. In this regard, the generated image data may be YUV 4:4:4 format image data. The decoding apparatus 55 may determine a representative value of a pixel of each line of the YUV 4:4:4 format image data from 2 bits or 3 bits of an MSB of the pixel of each line. In the case of pixels 1 and 3, the decoding apparatus 55 may allocate the determined representative value to a third column of each of first and third lines. In the case of pixels 0 and 2, the decoding apparatus 55 may allocate the determined representative value to a first column of each of the first and third lines.

The decoding apparatus 55 may obtain the YUV 4:2:0 format image data by dropping a sample value of an up-sampled region from chroma data including the allocated sample value.

Figure 12A:
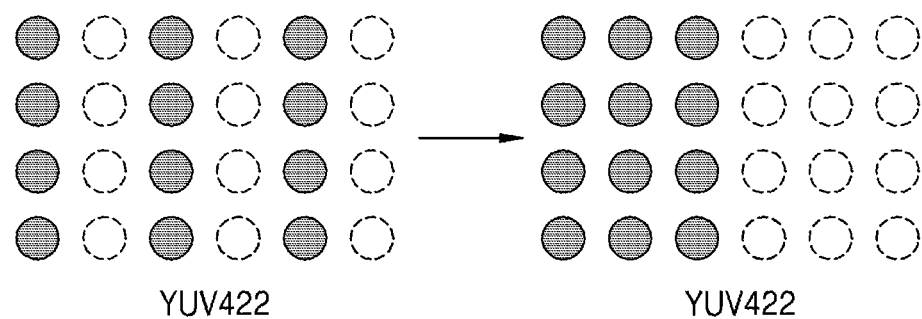
FIG. 12A is a diagram for describing a process of encoding image data in an encoding apparatus for YUV 4:2:0 format image data according to an embodiment of the present disclosure.

FIG. 12A is a diagram for describing a process of encoding image data in an encoding apparatus for YUV 4:2:0 format image data according to an embodiment of the present disclosure.

12A shows chroma data included in YUV 4:2:2: format image data.

The YUV 4:2:2: format chroma data has a chroma sample value in odd columns and has no chroma sample value in even columns. To effectively encode the chroma data, one chroma group (3 pixels) may be mapped to two luma groups (three pixels). Referring to FIG. 12, the YUV 4:2:2: format chroma data includes information regarding three pixels in odd columns of one line in correspondence to luma data of six pixels of one line.

The chroma data is arranged in odd columns. As shown in a right figure of FIG. 12A, the chroma data is moved to one side such that front three pixels may include a chroma sample value and back three pixels may not include a chroma sample value. The encoding apparatus 30 may encode all luma and chroma components with respect to the front three pixels and may encode only luma components with respect to the back three pixels.

Since the front three pixels include luma components and chroma components corresponding to the luma components, the encoding apparatus 30 may encode the front three pixels in an index color history (ICH) mode.

Since the encoding apparatus 30 encodes only luma component in the case of the back three pixels, the encoding apparatus 30 may determine not to encode a back part in the ICH Mode. In this case, since the encoding apparatus 30 does not encode the back part in the ICH mode, index information related to the ICH mode is not generated.

Figure 12B:
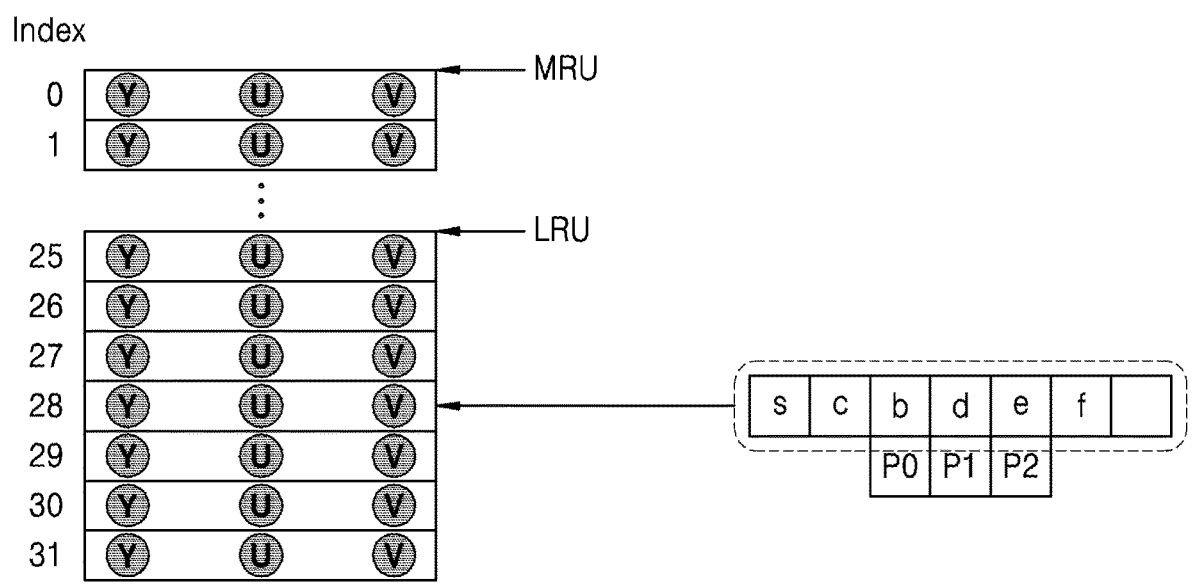
FIG. 12B is a diagram for describing an index color history (ICH) mode according to an embodiment of the present disclosure.

FIG. 12B is a diagram for describing an ICH mode according to an embodiment of the present disclosure.

The encoding apparatus 1 performs encoding on a three-pixel basis. In this regard, the encoding apparatus 1 may simultaneously predict three pixels. It is assumed that pixels P0, P1, and P2 are to be predicted. Pixels s, c, b, d, e, and f are pixels encoded and decoded in a previous line. Sample values of YUV components of the pixels may be stored in a predetermined storage space and then accessed by a 5-bit index. For example, the sample values of YUV components of positions of pixels of previous lines up to index 25-31 may be accessed. In the ICH mode, if the sample values of YUV components are accessed by an index, the sample value is a prediction value of a currently predicted pixel. Up to index 0-24, the sample values of YUV components of previously encoded and decoded pixels are stored in a line that is currently predicted.

In conclusion, the ICH mode means a mode in which the values of YUV components of recently used pixels are stored and a prediction value of a currently predicted pixel is determined with reference to a value by using a specific index.

For example, if the sample values of YUV components are respectively 10, 9, and 8 in the pixel b, the values may be stored in a line buffer and may be accessed by the index 27. When a prediction value of the current pixel P0 is determined, encoding may be performed according to the ICH mode, and the sample values of YUV components of the pixel b may be determined as the prediction values of YUV components of the current pixel P0. In this regard, the index 27 and information regarding whether to use the ICH mode may be included in a bitstream. The decoding apparatus 2 may determine the prediction values of YUV components of the current pixel P0 according to the ICH mode by using the information regarding whether to use the ICH mode and the index that are included in the bitstream.

Figure 13:
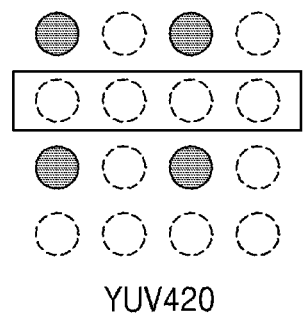
FIG. 13 is a diagram for describing a process of encoding image data in an encoding apparatus for YUV 4:2:0 format image data according to an embodiment of the present disclosure.

FIG. 13 is a diagram for describing a process of encoding image data in an encoding apparatus 40 for YUV 4:2:0 format image data according to an embodiment of the present disclosure.

Referring to FIG. 13, chroma data included in the YUV 4:2:0 format image data does not include a chroma sample value in odd or even lines. It is assumed in the present embodiment that the chroma data included in the YUV 4:2:0 format image data does not include a chroma sample value in even lines.

The general encoding apparatus 1 encodes all up-sampled chroma data on the premise that YUV 4:4:4 format image data is input.

However, when it is assumed that the YUV 4:2:0 format image data is input, chroma data of even lines may not be encoded but chroma data of odd lines may be encoded.

That is, although the YUV 4:2:0 format image data is converted into the YUV 4:4:4 format image data and is input to the encoding apparatus 40, chroma data of only up-sampled lines may not be encoded. Only luma data of only up-sampled lines may be transmitted.

Figure 14:
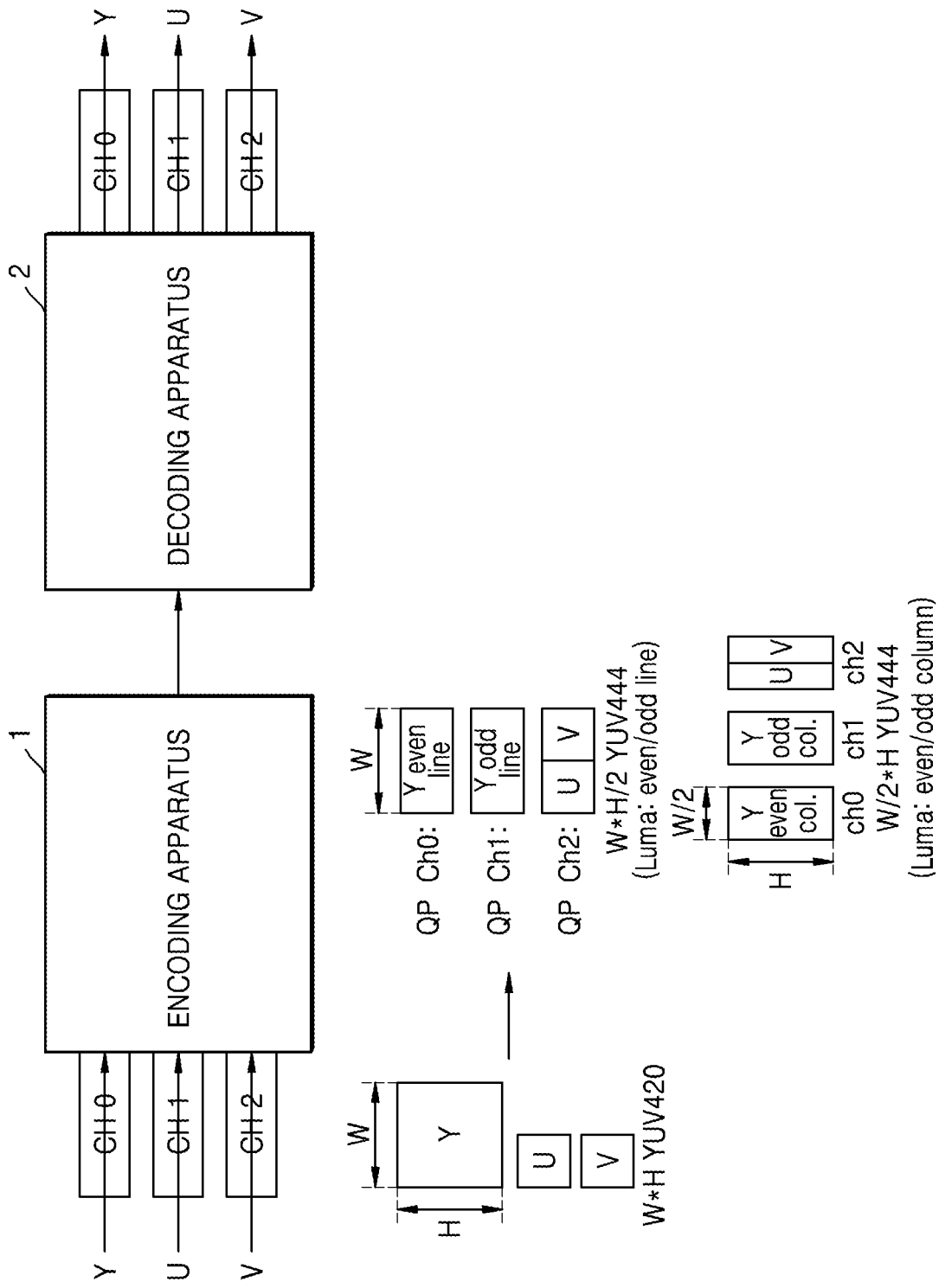
FIG. 14 is a diagram for describing encoding/decoding processes in encoding/decoding apparatuses by using independent parameters for each channel according to an embodiment of the present disclosure.

FIG. 14 is a diagram for describing encoding/decoding processes in encoding/decoding apparatuses by using independent parameters for each channel according to an embodiment of the present disclosure.

Referring to an upper end of FIG. 14, the encoding apparatus 1 may receive an input of image data of YUV components through the channel ch0 for a Y component, the channel ch1 for a U component, and the channel ch2 for a V component. The encoding apparatus 1 may quantize and encode the image data of each component by differentiating a quantization parameter with respect to each channel. Since human eyes are less sensitive to luma than chroma, the encoding apparatus 1 may generally quantize and encode luma data by using a low quantization parameter with respect to luma data.

The encoding apparatus 1 may quantize and encode chroma data such as the U and V components by using a high quantization parameter.

However, the encoding apparatus 1 may preset channels for the Y, U, and V components and determine a value of a quantization parameter used in the channel for the Y component to be dependently smaller than a value of a quantization parameter used in the channel for the U or V component.

Referring to a lower end of FIG. 14, as described above, the encoding apparatus 60 may split luma data into two pieces of luma data in a spatial domain and allocate the split two pieces of luma data to two channels. However, if the channel ch0 is for a luma component, and the channel ch1 is for a chroma component, a value of a quantization parameter used in the channel ch1 for the chroma component to be greater than a value of a quantization parameter used in the channel ch0 for the luma component. Thus, when the split two pieces of luma data are allocated to the channels ch0 and ch1, the split two pieces of luma data may be encoded by using different quantization parameters. Thus, in this case, a difference in a quantization parameter may cause a distortion phenomenon. Therefore, the encoding apparatus 60 according to an embodiment may encode chroma data and luma data having a plurality of components including chroma and luma components by using an independent quantization parameter with respect to each of a plurality of channels to which the chroma data and the luma data are allocated.

In this case, since a quantization parameter is independently determined for each channel, although luma data is split into two pieces of luma data and the two pieces of luma data are allocated to two channels, the luma data may be encoded by using the same quantization parameter, thereby preventing an image distortion phenomenon.

The encoding apparatus 60 may independently determine a quantization parameter with respect to each channel, determine an offset of quantization parameters of other channels with respect to one channel, and transmit a bitstream including information relating to the offset.

The decoding apparatus 65 may determine quantization parameters of other channels with respect to one channel based on the information relating to the offset included in the bitstream. The decoding apparatus 65 may decode image data by using the determined quantization parameters.

Figure 15A:
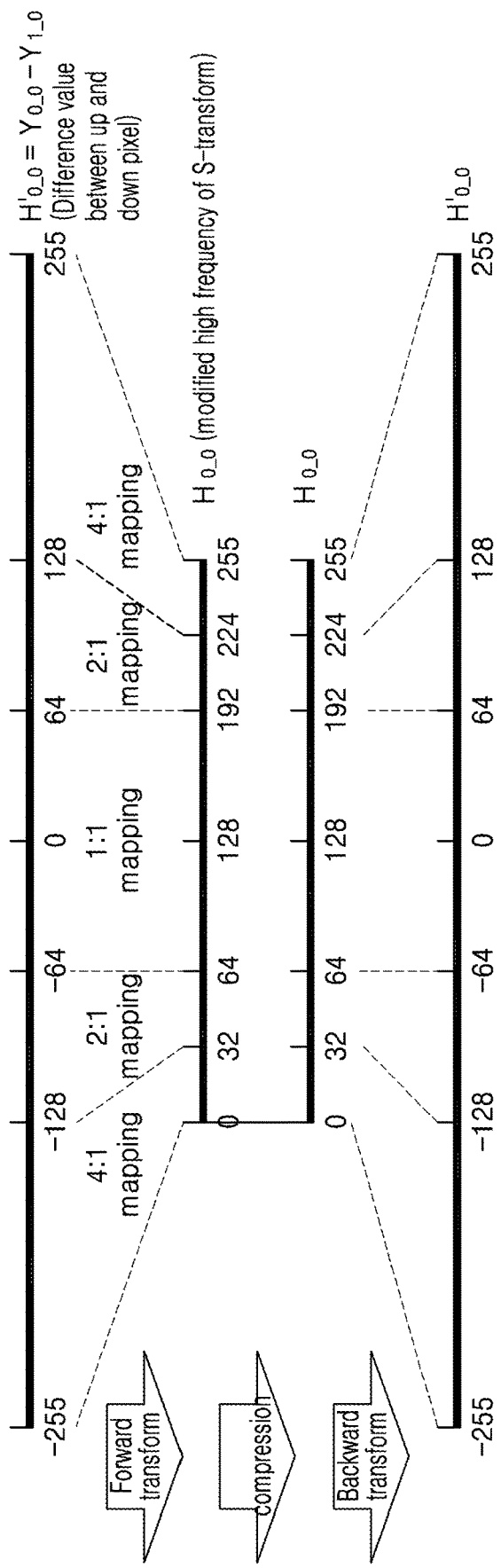
FIG. 15A is a diagram for describing a process of determining luma data of a high frequency region according to an embodiment of the present disclosure.

FIG. 15A is a diagram for describing a process of determining luma data of a high frequency region according to an embodiment of the present disclosure.

Referring to FIG. 15A, the encoding apparatus 10 may convert a frequency by using a well-known S-transform method when frequency conversion is performed on luma data. For example, H!!0_0 (a high frequency component of a $0^{th}$ row and $0^{th}$ column pixel) may be calculated by using a difference between Y0_0 (a luma sample value of a $0^{th}$ row and $0^{th}$ column pixel) and Y1_0 (a luma sample value of a $1^{st}$ row and $0^{th}$ column pixel). In this regard, the number of bits used to express H!!0_0 may be different from the number of bits Y0_0 and Y1_0. For example, when the number of bits expressing Y0_0 and Y1_0 is 8, the number of bits used to express H!!0_0 is 9.

To make the number of bits used to express H!!0_0 identical to the number of bits Y0_0 and Y1_0, values expressed as the number of bits of H!!0_0 may be unequally mapped to values expressed as the number of bits Y0_0 and Y1_0 (forward transform).

In particular, the reason why unequal mapping is performed is because sample values of a high frequency domain are mostly small. Small sample values are mapped at a 1:1 ratio. Great sample values are unequally mapped (2:1 or 4:1 mapping), which causes a loss in a sample value but may reduce the number of bits. The decoding apparatus 15 performs a decoding process opposite to an encoding process in order to reconstruct H!!0_0 (backward transform). In this regard, sample values of a great sample value section may be inversely mapped (1:2 or 1:4 inverse mapping) to reconstruct H!!0_0. In this regard, the reconstructed H!!0_0 may be different from H!!0_0 before encoded since a data loss may occur during a process of mapping sample values at a 2:1 or 4:1 ratio. A mapping process (forward transform) and an inverse mapping process (backward transform) may be performed by the encoding apparatus 10 or the decoding apparatus 15 by a pseudo code as shown in a lower end of FIG. 15A (in this regard, bitdepth denotes a depth of a bit expressing a luma pixel). For example, if a depth of a bit expressing a luma pixel is 8, offset1 is 64, and offset2 is 128. In this regard, offset1 and offset2 denote boundary values of sections that uses different mapping methods as shown in FIG. 15A.

Figure 15B:
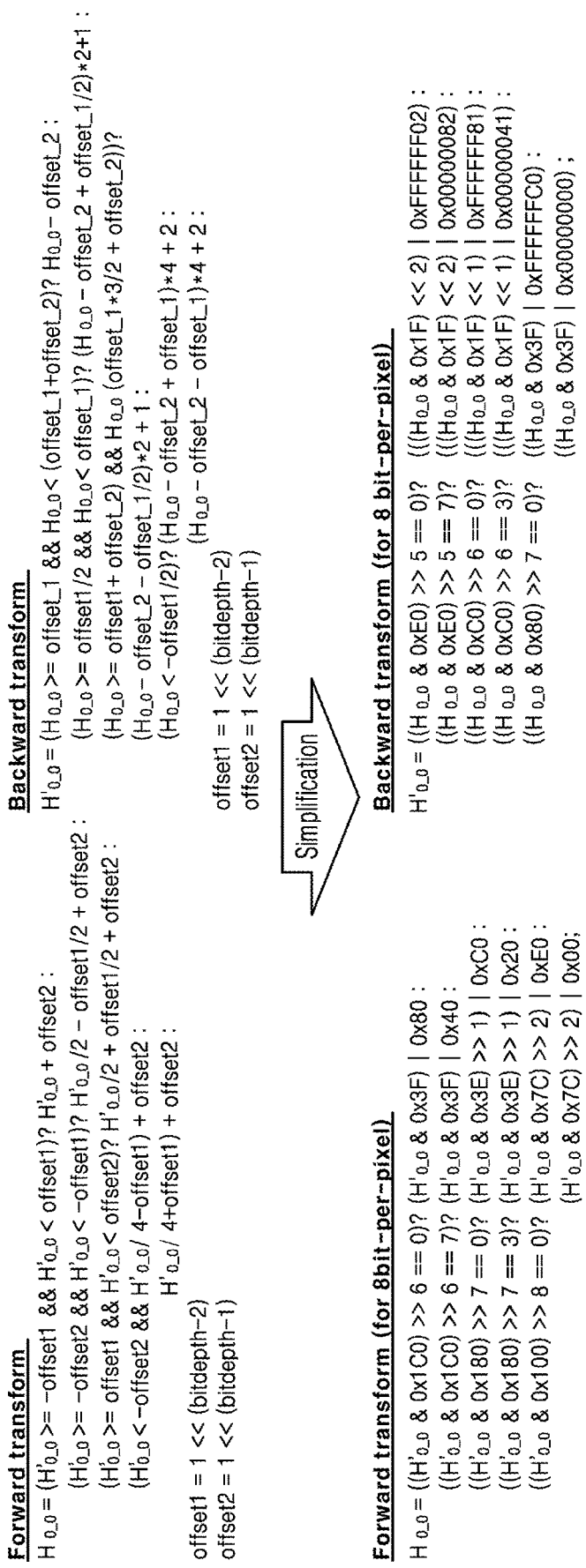
FIG. 15B is a diagram for describing a detailed process of determining luma data of a high frequency region according to an embodiment of the present disclosure.

FIG. 15B is a diagram for describing a detailed process of determining luma data of a high frequency region according to an embodiment of the present disclosure.

FIG. 15B shows codes expressed in a C language when the encoding apparatus 10 or the decoding apparatus 15 maps or inversely maps sample values as described with reference to FIG. 15A above. As shown in FIG. 15B, during a process of mapping or inverse mapping sample values, an operator that can be relatively performed fast on hardware, such as a shift operator (>>) moving bits and a bit operator (&,|) performing comparison between bits, may be used. Thus, since a calculation operation, such as addition or subtraction, is not performed using hardware, the speed for mapping or inverse mapping sample values may be fast.

FIG. 15C is a diagram for describing a detailed process of determining luma data of a high frequency region according to an embodiment of the present disclosure.

FIG. 15C shows codes expressed in a register transfer language (RTL) when the encoding apparatus 10 or the decoding apparatus 15 maps or inversely maps sample values as described with reference to FIG. 15A above. As shown in FIG. 15C, during a process of mapping or inverse mapping sample values, a calculation operation that can be relatively performed fast on hardware such as comparing bits and allocating bits may be used. Thus, since a calculation operation, such as addition or subtraction, is not performed using hardware, the speed for mapping or inverse mapping sample values may be fast.

While the present disclosure has been particularly shown and described with reference to specific embodiments thereof, it will be understood by one of ordinary skill in the art that various changes in form and details may be made therein without departing from the spirit and scope of the invention as defined by the following claims. The embodiments should be considered in a descriptive sense only and not for purposes of limitation. Therefore, the scope of the invention is defined not by the detailed description of the invention but by the following claims, and all differences within the scope will be construed as being included in the present invention.

The invention claimed is:

1. A video data encoding method performed by at least one encoder, the video data encoding, method comprising:
 splitting luma data having one component included in image data into two pieces of luma data and allocating the two pieces of luma data to luma channels comprising a plurality of channels, wherein the plurality of channels includes a first channel and a second channel, and wherein a first sample of a current location in a current line of low frequency region data of the first channel which is one piece of luma data for the first channel corresponds to a sum of a first pixel luma value of the current location and a second pixel luma value of a lower location which is in an adjacent lower line of the current line, and wherein a first sample of the current location of high frequency region data of the second channel which is one piece of luma data for the second channel corresponds to a difference of the first pixel luma value of the current location and the second pixel luma value of the lower location;
 allocating chroma data having a plurality of components included in the image data to a chroma channel comprising one channel; and
 encoding the image data based on the luma data allocated to the luma channels and the chroma data allocated to the chroma channel.

2. The video data encoding method of claim 1, wherein the splitting of the luma data having one component into two pieces of luma data in the frequency region comprises:
 obtaining a sample value of a high frequency region;
 determining one first portion range comprising the obtained sample value among a plurality of first portion ranges corresponding to a first allowable range of the sample value of the high frequency region; and
 mapping the first portion range to one of a plurality of second portion ranges corresponding to a second allowable range of the sample value of the high frequency region, wherein a size of the first allowable range is greater than a size of the second allowable range.

3. The video data encoding method of claim 1, wherein the allocating of the chroma data having the plurality of components included in the image data to the chroma channel comprising one channel comprises:
 time sharing the chroma channel; and
 allocating the chroma data having the plurality of components to the time shared chrome channel.

4. A video data decoding method comprising:
 receiving a bitstream comprising encoded image information;
 decoding an image based on the encoded image information and obtaining luma data allocated to luma channels comprising a plurality of channels and chroma data allocated to a chroma channel comprising one channel from data generated by decoding the image, wherein the plurality of channels includes a first channel and a second channel;
 merging the obtained luma data as luma data having one component, wherein the merging comprises merging low frequency region data of the first channel with high frequency region data of the second channel, wherein a first sample of a current location in a current line of low frequency region data of the first channel corresponds to a sum of a first pixel luma value of the current location and a second pixel luma value of a lower location which is in an adjacent lower line of the current line, and wherein a first sample of the current location of high frequency region data of the second channel corresponds to a difference of the first pixel luma value of the current location and the second pixel luma value of the lower location;
 splitting the obtained chroma data into chroma data having a plurality of components; and
 reconstructing the image based on the luma data having one component generated by merging the obtained luma data and the split chroma data having the plurality of components.

5. A video data decoding apparatus comprising: at least one decoder, the video data decoding apparatus configured to:
 receive a bitstream comprising encoded image information,
 obtain luma data allocated to luma channels comprising a plurality of channels and chroma data allocated to a chroma channel comprising one channel from data generated by decoding the image, wherein the plurality of channels includes a first channel and a second channel,
 merge the obtained luma data as luma data having one component by merging low frequency region data of the first channel with high frequency region data of the second channel, wherein a first sample of a current location in a current line of low frequency region data of the first channel corresponds to a sum of a first pixel luma value of the current location and a second pixel luma value of a lower location which is in an adjacent lower line of the current line, and wherein a first sample of the current location of high frequency region data of the second channel corresponds to a difference of the first pixel luma value of the current location and the second pixel luma value of the lower location,
 split the obtained chroma data into chroma data having a plurality of components, and
 reconstruct the image based on the luma data having one component generated by merging the obtained luma data and the split chroma data having the plurality of components.

6. A non-transitory computer-readable recording medium having recorded thereon a program for executing the video data encoding method of claim 1.

* * * * *